(12) United States Patent
Fan et al.

(10) Patent No.: US 8,890,932 B2
(45) Date of Patent: Nov. 18, 2014

(54) HOLOGRAPHIC PROJECTION REAL-TIME 3D DISPLAY SYSTEM AND METHOD

(75) Inventors: Cheng Fan, Guangdong (CN); Zhisen Cai, Guangdong (CN); Chaochuan Jiang, Guangdong (CN)

(73) Assignee: AFC Technology Co., Ltd., Shenzhen (CN)

( * ) Notice: Subject to any disclaimer, the term of this patent is extended or adjusted under 35 U.S.C. 154(b) by 468 days.

(21) Appl. No.: 13/141,490

(22) PCT Filed: Jun. 29, 2009

(86) PCT No.: PCT/CN2009/072499
§ 371 (c)(1),
(2), (4) Date: Jun. 22, 2011

(87) PCT Pub. No.: WO2010/072067
PCT Pub. Date: Jul. 1, 2010

(65) Prior Publication Data
US 2011/0254916 A1  Oct. 20, 2011

(30) Foreign Application Priority Data
Dec. 25, 2008 (CN) .......................... 2008 1 0241842

(51) Int. Cl.
*H04N 15/00* (2006.01)
(Continued)

(52) U.S. Cl.
CPC ............. *G03H 1/04* (2013.01); *H04N 13/0447* (2013.01); *H04N 13/0242* (2013.01);
(Continued)

(58) Field of Classification Search
USPC ........................................... 348/41; 345/419
See application file for complete search history.

(56) References Cited

U.S. PATENT DOCUMENTS 5,260,814 A * 11/1993 Smith et al. ..................... 359/23
2007/0121182 A1 * 5/2007 Fukushima et al. .............. 359/9
(Continued)

FOREIGN PATENT DOCUMENTS

CN  1560702  1/2005
CN  1608386  4/2005
(Continued)

OTHER PUBLICATIONS

Three-Dimensional Imaging Methods Based on Multiview Images, IEEE/OSA Journal of Display Technology, vol. 1, No. 1, pp. 125-140, Sep. 2005 Authors: Jung-Young Son and Bahram Javidi.*

(Continued)

*Primary Examiner* — Dave Czekaj
*Assistant Examiner* — Berteau Joisil
(74) *Attorney, Agent, or Firm* — Hamre, Schumann, Mueller & Larson, P.C.

(57) ABSTRACT

A real-time color holographic three-dimensional (3D) display system and method realized by using principles of digital holographic display and a common photographing/projection device array system are provided. For an object O to be displayed, an array of M×N cameras which are anchored to a certain reference point R in a space corresponding to the object O is used to perform spatial spectrum sampling and capturing on any spatial spectrum surface S of the object O with a sampling density being a spatial sampling angle $\omega_{mn}$. Each acquired spatial spectrum view image $I_{mn}$ is projected by a corresponding array of M×N projectors in each spatial spectrum capturing direction to a reference surface $P_R$ necessary for restoring 3D information of the original object O. Output of full spatial spectrums of the object O is realized through a spatial spectrum limited stretching function of a holographic functional screen placed on the reference surface $P_R$ which is used on discrete spatial spectrum input image information, thereby achieving digital holographic display intended to restore complex wavefronts.

18 Claims, 26 Drawing Sheets

(51) Int. Cl.
*H04N 13/04* (2006.01)
*H04N 13/02* (2006.01)
*G03B 35/08* (2006.01)
*G03B 35/18* (2006.01)
*G02B 27/22* (2006.01)
*G03H 1/04* (2006.01)
*G03H 1/02* (2006.01)

(52) U.S. Cl.
CPC ... *G03H 2001/0439* (2013.01); *H04N 13/0459* (2013.01); *G03H 2001/0288* (2013.01); *G03B 35/08* (2013.01); *G03B 35/18* (2013.01); *G03H 2224/02* (2013.01); *G02B 27/2278* (2013.01)
USPC .......................................................... 348/41

(56) References Cited

U.S. PATENT DOCUMENTS

2008/0246757 A1* 10/2008 Ito ................................. 345/419
2010/0253677 A1* 10/2010 Kroll et al. .................... 345/419

FOREIGN PATENT DOCUMENTS

| CN | 1811589 | 8/2006 |
| CN | 100389366 | 5/2008 |
| GB | 1384963 | 2/1975 |

OTHER PUBLICATIONS

Tay et al., "An updatable holographic three-dimensional display," Nature, vol. 451, 2008, pp. 694-698.

* cited by examiner

```
Record holographic lens information on a
photolithographic rubber plate
          │
          ▼
Metalize the exposed photolithographic rubber
plate, and generate a holographic lens array
motherboard by electroforming and splicing
          │
          ▼
Perform mold pressing on a thermoplastic
material by using the motherboard
```

FIG. 29C

```
Divide a laser beam into two paths, which
converge on a photolithographic rubber plate
          │
          ▼
A computer controls opening and closing of a shutter and
movement of the photolithographic rubber plate
          │
          ▼
Record information of multiple holographic lenses evenly
on the photolithographic rubber plate
          │
          ▼
Metalize the exposed photolithographic rubber plate, and generate a holographic
lens array motherboard by electroforming and splicing
          │
          ▼
Perform mold pressing on a thermoplastic
material by using the motherboard
          │
          ▼
After the mold pressing, coat the holographic
lens array with a protective layer
```

FIG. 29D

HOLOGRAPHIC PROJECTION REAL-TIME 3D DISPLAY SYSTEM AND METHOD

BACKGROUND OF THE INVENTION

1. Field of the Invention

The present invention relates to a real-time 3D display system realized by using holographic projection, which comprises a capturing device, a projection device, and a display for a real-time 3D image, and relates to a real-time 3D display method, a real-time 3D image capture method, a projection display method, and a display manufacturing method.

2. Related Art

Chinese Patent No. ZL200410022193.7 entitled "METHOD AND DEVICE FOR MAKING DIGITAL SPECKLE HOLOGRAM", and Chinese Patent No. ZL200510022425.3 entitled "HOLOGRAPHIC PROJECTION SCREEN, AND MANUFACTURING METHOD, SYSTEM, AND APPLICATION THEREOF" are incorporated herein by reference in their entireties.

Since the beginning of the last century, scientists never stop the search for a proper method to solve the "3D imaging" problem. Although the practical applications of 3D cinemas and lens board 3D photos in the middle of the last century marked a certain breakthrough, human beings are still far away from effectively realizing the super dream of moving visual space, that is, vividly transferring and displaying 3D information of the nature. Common fatal defects of the prior art are as follows. The 3D sense is false (for example, the audience in the cinema sees completely the same image at different positions). The resolution requirements for the imaging quality are sacrificed for a limited subjective feeling of the 3D reality. The implementation process is complicated. Sometimes, special inconvenient glasses are required for viewing.

The invention of the holography marks the birth of a brand new human visual medium, which can naturally transfer and display visual information in a 3D manner. However, the holography is still far from color real-time holographic 3D visual space moving and displaying. The pulse holography, composite holographic 3D images, and the rainbow holography lead to holographic printing and packaging industries that are currently popular around the world, the core of which is to provide anti-counterfeiting representations used for anti-counterfeiting and authentication concerning security of files and brands. Digital holographic printing technologies brings forth a method more proper than the conventional technologies of computer-generated holograms (CGHs), and the complicated computing and coding is replaced by a more efficient holographic recording manner, thereby solving the problem of output difficulty dedicated to restoring the amplitudes and phases. However, the digital holography is so far still limited to the printing and displaying of holograms.

For the real-time 3D displaying, many solutions are proposed before and after the invention of the holography. However, none of the solutions is further developed due to the subjective visual processing manner of the issue and lack of proper theoretical support and experimental conditions.

Recently, with the development of the television (TV) information technologies and a clever application of a Spatial Light Modulator (SLM), a solution of a 3D holographic TV set is proposed for real-time 3D display. However, like the films and TV programs, all the methods use the effect of persistence of vision to realize 3D display by scanning and outputting spatial 3D information in a time-sharing manner, and therefore the TV set is not a real holographic TV set showing TV information in a holographic manner in the strict sense. Many methods proposes technologies such as directly reproducing a hologram written during power-on of the SLM to realize real-time 3D display, increasing a view angle, and realizing color display. Limited by a spatial bandwidth product of the conventional SLM, the methods are obviously far from practical application, and increase of the spatial bandwidth product is ultimately restricted by the so called Moore's Law manifesting integration capability of electronic chips. In an article "An updatable holographic three dimensional display", recently published in Nature, Vol. 451/7 February 2008/694-698, a holographic TV set seems about to come true, but the practical application of the new holographic material is still inconceivable.

Practically, the nature is originally presented to humans in a real 3D manner. The 2D image information can only enable us to learn one side of an object, which to a great extent prevents the humans from learning the essence of the object comprehensively. It is a pity that although humans live in a 3D world, the human technologies still has to manifest the world in a 2D manner. For example, photos, films or TV programs form the main media of effectively transferring visual information of humans in the twentieth century. In the development of the science and technology in the 21st century, humans are bound to consider the approach of restoring a real 3D world being expressed by collecting massive image information according to a certain rule and reinterpreting and displaying the information in a real 3D manner, the approach of realizing 3D reconstruction and display of the massive image information, and the scientific relationship between the 2D image and the 3D display.

SUMMARY OF THE INVENTION

The present invention is directed to a holographic projection real-time 3D display system and method, so as to realize real 3D display dreamt by people for a long time.

Accordingly the present invention provides a color real-time holographic 3D display system, which comprises a photographing and capturing device of color real-time holographic 3D image information, a projective restoration device of real-time holographic image information, and a holographic functional screen.

The photographing and capturing device comprises M×N color 2D image capturing units $C_{mn}$, which are used to sample and capture M×N spatial spectrums on any spatial spectrum surface S of an object O to be displayed in a 3D manner, each sample point $S_{mn}$ corresponds to a hoxel $H_{mn}$ of the object O, and information captured by each image capturing unit $C_{mn}$ is equivalent to a spatial spectrum view $I_{mn}$ corresponding to the hoxel $H_{mn}$, so that M×N arrays of sample spatial spectrum image information of the object O are acquired. The M×N color 2D image capturing units $C_{mn}$ are arranged on the spatial spectrum surface S according to preset spatial sampling angles $\omega_{mn}$, and imaging optical axes thereof are anchored to the same reference point R of the space corresponding to the object O. Each image capturing unit focuses on a visible surface of the object O in the corresponding spatial spectrum direction to acquire the clear view $I_{mn}$ in the direction.

The projective restoration device comprises M×N color 2D image projection units $P_{mn}$, which are respectively used to simultaneously project the captured corresponding array sample view $I_{mn}$ at the M×N hoxels $H_{mn}$ to a reference surface $P_R$ in a restoration space corresponding to the original object O according to corresponding anchor relationships during the capturing, and make a projective pattern of each projective view image on the reference surface be consistent with a spatial spectrum projective pattern of the original object O in the direction. The M×N color 2D image projection units $P_{mn}$ are arranged on a corresponding surface S' of the spatial spectrum surface S in a restoration space according to the spatial sampling angles $\omega_{mn}$ same as those during the capturing, and imaging optical axes of the projection units $P_{mn}$ are anchored on a corresponding point R' of the reference point R in the restoration space.

M, N, m, and n are natural numbers, and at least one of M and N is greater than 2.

The holographic functional screen is placed on the reference surface $P_R$, and is used to perform spatial spectrum stretching corresponding to the spatial sampling angles $\omega_{mn}$ on input information of the view $I_{mn}$ carried in each single spatial spectrum, so that after the stretching, output spatial spectrum distributions of the views $I_{mn}$ are connected to each other, but do not overlap, thereby ensuring that a digital holographic spatial spectrum of the restored 3D spatial information is restored and output continuously and completely. That is, for each hoxel $H_{jk}$ on the holographic functional screen, a stretching angle of a spatial unidirectional input light beam is exactly the spatial sampling angle $\omega_{mn}$, thereby achieving holographic 3D display intended to restore complex wavefronts.

The present invention further includes the following preferred technical features.

The capturing units of the photographing and capturing device respectively correspond to the projection units of the projective restoration device one by one. Image information captured by each capturing unit may be directly or indirectly transferred to the projection unit corresponding to the capturing unit in any digital image transmission format, without having to essentially code and reorganize the specific image information.

A color real-time holographic 3D display method comprises: a photo capturing process of color real-time holographic 3D image information, a projective restoration process of real-time holographic image information, and a limited stretching process of a holographic functional screen.

The photo capturing process comprises the following steps. M×N color 2D image capturing units $C_{mn}$ are used to sample and capture M×N spatial spectrums on any spatial spectrum surface S of an object O to be displayed in a 3D manner, each sample point $S_{mn}$ corresponds to a hoxel $H_{mn}$ of the object O, and information captured by each image capturing unit $C_{mn}$ is equivalent to a spatial spectrum view $I_{mn}$ corresponding to the hoxel $H_{mn}$, so that M×N arrays of sample spatial spectrum image information of the object O are acquired. The M×N color 2D image capturing units $C_{mn}$ are arranged on the spatial spectrum surface S according to preset spatial sampling angles $\omega_{mn}$, and imaging optical axes thereof are anchored to the same reference point R of the space corresponding to the object O. Each image capturing unit focuses on a visible surface of the object O in the corresponding spatial spectrum direction to acquire the clear view $I_{mn}$ in the direction.

The projective restoration process comprises the following steps. M×N color 2D image projection units $P_{mn}$ are respectively used to simultaneously project the captured corresponding array sample view $I_{mn}$ at the M×N hoxels $H_{mn}$ to a reference surface $P_R$ in a restoration space corresponding to the original object O according to corresponding anchor relationships during the capturing, and make a projective pattern of each projective view image on the reference surface be consistent with a spatial spectrum projective pattern of the original object O in the direction. The M×N color 2D image projection units $P_{mn}$ are arranged on a corresponding surface S' of the spatial spectrum surface S in a restoration space according to the spatial sampling angles $\omega_{mn}$ same as those during the capturing, and imaging optical axes of the projection units $P_{mn}$ are anchored on a corresponding point R' of the reference point R in the restoration space.

M, N, m, and n are natural numbers, and at least one of M and N is greater than 2.

The limited stretching process of the holographic functional screen comprises the following steps. The holographic functional screen is placed on the reference surface $P_R$, so as to perform spatial spectrum stretching corresponding to the spatial sampling angles $\omega_{mn}$ on input information of the view $I_{mn}$ carried in each single spatial spectrum, so that after the stretching, output spatial spectrum distributions of the views $I_{mn}$ are connected to each other, but do not overlap, thereby ensuring that a digital holographic spatial spectrum of the restored 3D spatial information is restored and output continuously and completely. That is, for each hoxel $H_{jk}$ on the holographic functional screen, a stretching angle of a spatial unidirectional input light beam is exactly the spatial sampling angle $\omega_{mn}$, thereby achieving holographic 3D display intended to restore complex wavefronts.

The capturing units in the capturing process respectively correspond to the projection units in the projective restoration process one by one. Image information captured by each capturing unit may be directly or indirectly transferred to the projection unit corresponding to the capturing unit in any digital image transmission format, without having to essentially code and reorganize the specific image information.

Besides spatial position calibration, corresponding time synchronization and color/brightness calibration further require to be performed on the capturing/projection units, so as to guarantee real-time restoration fidelity of the input/output information.

All the projection arrays can be arranged on any curved surface or curve in the space according to practical situations, so as to realize the color real-time holographic 3D display in any manner. The restored 3D space may be enlarged or downsized compared with the original 3D space.

The reference surface $P_R$ may be any curved surface, so as to meet diversified demands of color real-time holographic 3D display. The projection units present clear and discernable specific image information on the reference surface $P_R$, and already complete necessary corresponding graphic distortion correction thereof.

The spatial spectrum spatial sampling angle $\omega_{mn}$, or the reciprocal thereof, $1/\omega_{mn}$, the spatial sampling density of the system determines capability of restoring clear and discernable 3D spatial information of the system. That is, the holographic functional screen can output a real image or virtual image spot at a location away from the reference surface $P_R$ by a distance $\Delta Z$. The size of the spot is similar to that of a plane pixel of each spatial spectrum input image on the screen.

Imaging quality of the capturing/projection units involves a field angle, resolution, brightness, contrast, color gradation, and color saturation, to which existing basic standards of ordinary 2D image display can be applied.

Principles of anchoring the capturing/projection units are as follows. 1) A view image processed by the capturing/projection unit represents a geometric projection of the 3D object O in a spatial spectrum direction determined by a connecting line between an anchor point R(R') and a sampling point $S_{mn}(S'_{mn})$. That is, an image plane is a normal plane in the capturing/projection direction. 2) The view image does not rotate in an imaging optical axis direction of the capturing/projection unit in the image plane.

Corresponding graphic distortion and focus adjustment are performed on spatial spectrum view information processed by the capturing/projection units.

An effect of the present invention is that holographic real-time 3D display is achieved.

BRIEF DESCRIPTION OF THE DRAWINGS

The present invention will become more fully understood from the detailed description given herein below for illustration only, and thereby are not limitative of the present invention, and wherein:

FIG. 29C is a schematic view of basic manufacturing processes of a method of manufacturing a holographic projection screen according to an embodiment of the present invention;

FIG. 29D is a schematic view of specific manufacturing processes of a method of manufacturing a holographic projection screen according to an embodiment of the present invention;

DETAILED DESCRIPTION OF THE INVENTION

The present invention is further described below in detail with reference to embodiments and the accompanying drawings.

Embodiments of the present invention are made based on new theories, and theories related to the embodiments of the present invention are illustrated before the embodiments are described.

I. Four-Dimensional (4D) Fourier Transform of Wave Function

Light is formed of photons. Each photon has the minimum electromagnetic radiation energy thereof satisfying $\epsilon=h\nu$, where h is the Planck constant and satisfies $h=6.626\times10^{-34}$ J·S, v is a vibration frequency of the photon whose wavelength satisfies $\lambda=c/v$, and c is the speed of light, which is in vacuum a constant $c=2.997\,924\,58\times10^8$ m/s. A corresponding momentum of the photon satisfies $p=hk$, where k is a propagation vector, and satisfies $k=1/\lambda$. The above is consistent with the special theory of relativity, and a relationship among the mass, energy, and momentum of the particle herein satisfies $\epsilon=[(cp)^2+(mc^2)^2]^{1/2}$. For the photon, $m=0$, so that $\epsilon=cp$.

Figure 1:
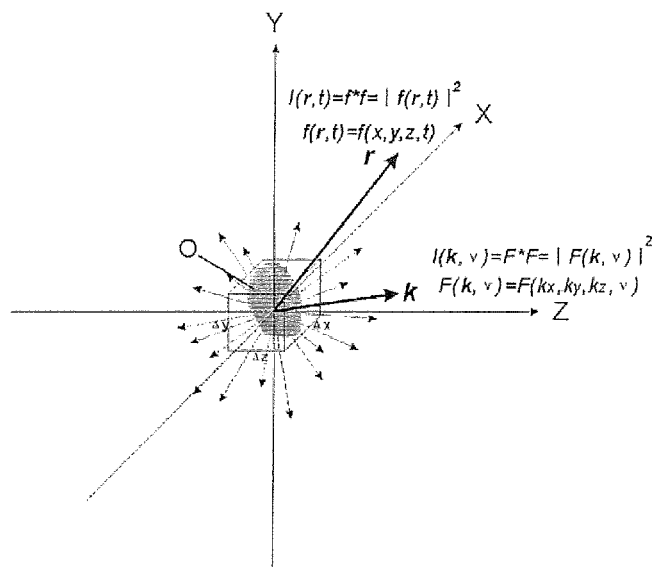
FIG. 1 is a schematic view of photon discrete energy distribution and a wave function.

Take an object O for example, the object O may be a part of any reflective object in nature, or an electromagnetic radiation light source. It is assumed that the object is placed near the origin of a 3D coordinate system (x,y,z), and the size thereof is within $\Delta x$, $\Delta y$, and $\Delta z$, so that at a time t, a large quantity of photons in different states are emitted from the object, and form photon discrete energy probability distribution I(x,y,z,t) surrounding the object, and the object is manifested as the real world perceivable by humans, as shown in FIG. 1.

A wave function or probability amplitude of the photon discrete energy probability distribution is defined as a complex function $f(x,y,z,t)$, and:

$$I(x,y,z,t)=f^*f=|f(x,y,z,t)|^2 \quad (1)$$

a 4D Fourier Transform of the wave function is defined as:

$$F(k_x, k_y, k_z, v) = \quad (2)$$
$$\int\int\int_{-\infty}^{+\infty}\int f(x,y,z,t)\exp[-j2\pi(k_x x + k_y y + k_z z + vt)]dxdydzdt$$

inverse transformation thereof is:

$$f(x,y,z,t) = \int\int\int_{-\infty}^{+\infty}\int F(k_x, k_y, k_z, v) \quad (3)$$
$$\exp[j2\pi(k_x x + k_y y + k_z z + vt)]dk_x dk_y dk_z dv$$

meanwhile, the photon discrete energy probability distribution is defined as:

$$I(k_x,k_y,k_z,v)=F^*F=|F(k_x,k_y,k_z,v)|^2 \quad (4)$$

wherein $k_x$, $k_y$, and $k_z$ are called spatial frequencies, and are components of a photon propagation vector k in directions x, y, and z, $k=1/\lambda=v/c$; v is a corresponding vibration frequency of photons in the same energy state, $\epsilon=h\nu$, and $\lambda v=c$.

In Formulas (1) to (4), integration of the time and frequency from $-\infty$ to $+\infty$ seems a little bit ridiculous since it is incomprehensible that the time and frequency are negative, so that we may instead use vector expressions to perform integration from 0 to $+\infty$, which is more physically reasonable.

Figure 2:
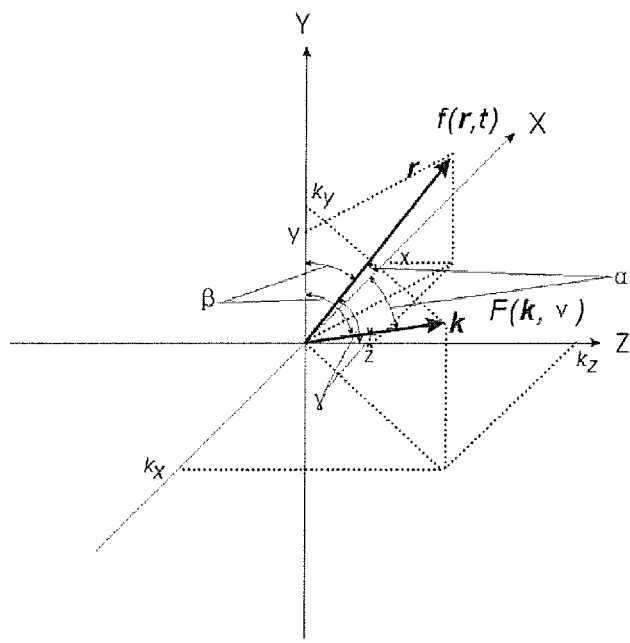
FIG. 2 is a schematic view of a position vector r and a propagation vector k.
Figure 3:
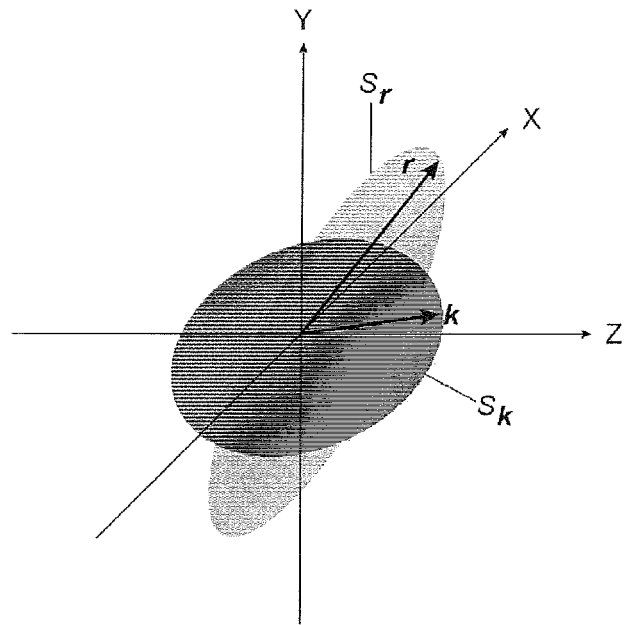
FIG. 3 is a schematic view of integral tracks of a vector variable.

If Formulas (1) to (4) are re-written in a vector expression manner:

in a temporal-spatial domain:

$$I(r,t) = f^*f = |f(r,t)|^2 \quad (5)$$

$$f(r,t) = \int\int_0^{+\infty}\int F(k,v)\exp[j2\pi(-k\cdot r + vt)]dkdv \quad (6)$$

in a spectral domain:

$$I(k,v) = F^*F = |F(k,v)|^2 \quad (7)$$

$$F(k,v) = \int\int_0^{+\infty}\int f(r,t)\exp[-j2\pi(-k\cdot r + vt)]drdt \quad (8)$$

where r is a position vector in a 3D space, $r^2=x^2+y^2+z^2$, $x=r\cos\alpha$, $y=r\cos\beta$, $z=r\cos\gamma$; k is a photon propagation vector, $k=1/\lambda$, $k^2=k_x^2+k_y^2+k_z^2$, $k_x=k\cos\alpha$, $k_y=k\cos\beta$, $k_z=k\cos\gamma$; $(\alpha,\beta,\gamma)$ are direction angles of vectors corresponding to the coordinate axis x, y, and z of the rectangular coordinate system, $\cos^2\alpha+\cos^2\beta+\cos^2\gamma=1$, and $k\cdot r=k_x x+k_y y+k_z z$, as shown in FIG. 2. A negative sign in front of $k\cdot r$ represents that the photons are emitted from the object outwards rather than converge from outside to inside to form the object, so that a phase of any photon in the space always lags behind an initial phase of a photon on a surface of the object. Integration on a vector variable function from 0 to $+\infty$ refers to linear superposition of the function at all the points in the entire space corresponding to a vector variable thereof, and includes an amplitude and a phase of the vector variable, in other words, along any closed curved surface, which surrounds the origin and is formed by scanning of the vector variable. Integration of vector variables in the same direction concerns the space-time coordinate (r,t) and other two scalar variables t and v in a frequency coordinate (k,v) corresponding to the space-time coordinate (r,t), so as to ensure that the integration is linear superposition of the 4D function, as shown in FIG. 3.

Obviously, Formulas (1) to (8) are pure mathematical processing of the complex function having four unknowns of the photon discrete energy probability distribution I(x,y,z,t), which however has significant physical meaning. In Formulas (1) to (3), integration of the time and frequency from $-\infty$ to $+\infty$ seems a little bit ridiculous since it is incomprehensible that the time and frequency are negative. However in Vector Expressions (4) to (6) corresponding to Formulas (1) to (3), the integration is performed from 0 to $+\infty$, which is more physically reasonable. Actually, basic concepts and processing methods of a one-dimensional (1D) signal, a 2D image, and a 3D hologram in the modern information technologies can all be derived from or traced back to the formulas. When the 4D Fourier transform theory is specified according to the following, existing familiar theories can be derived.

Figure 4:
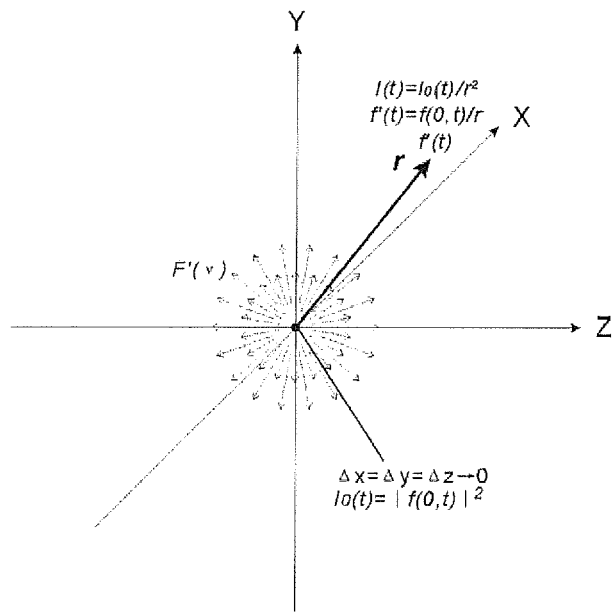
FIG. 4 is a schematic view of a wave function expression of a point radiation source.

1. A spherical wave and 1D Fourier transform pair: if an object is considered as a point radiation source, and photons in different energy states exist in each spatial direction, that is, when $t=0$, $\Delta x=\Delta y=\Delta z\to 0$, and as shown in FIG. 4:

$$f(r,0)=[f(0,0)/r]\exp[j2\pi(k\,r)] \quad (9)$$

which is a standard expression of a complex amplitude of a typical spherical wave with a wavelength being $\lambda=1/k$, which propagates in all directions of a space-time coordinate (x, y, z, t) or (r, t). At a time t, the wave function is expressed as:

$$f(r, t) = [f(0, t)/r]\exp(j2\pi kr)\exp(-j2\pi vt) \quad (10)$$
$$= [f(0, t)/ct]\exp\{-j2\pi vt[1 - (kr/vt)]\}$$
$$= f(0, t)/ct$$
$$= f'(t) \quad (10)'$$

where $r=ct$, and $kr=(1/\lambda)(c\,t)=(c/\lambda)t=vt$, so that the function $f(r,t)$ is automatically transformed to $f(t)$, which is only dependent on the time. Therefore, Formulas (5), (6), (7), and (8) are written into a 1D manner:

$$I(t) = f^*f = |f'(t)|^2 = |f(0, t)/r|^2 \quad (11)$$

$$F'(v) = \int_0^{+\infty} f'(t)\exp(-j2\pi vt)dt \quad (12)$$

$$I(v) = F'^*F' = |F'(v)|^2 \quad (13)$$

$$f'(t) = \int_0^{+\infty} F'(v)\exp(j2\pi vt)dv. \quad (14)$$

Figure 5:
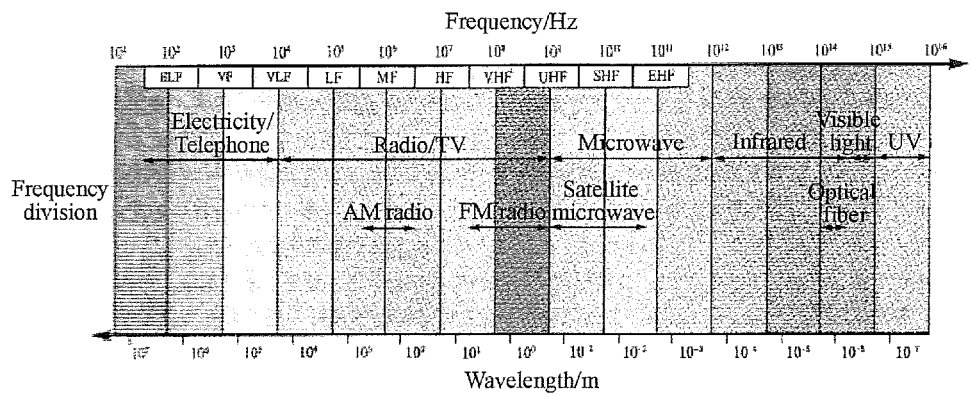
FIG. 5 is formation of a time spectrum of electromagnetic radiation.

The above is the conventional 1D Fourier transform pair used to process the time and signal in communication theories, an electromagnetic radiation spectrum or a light spectrum of which is as shown in FIG. 5, in which a visible light band is very narrow. According to the conventional spectroscopy, a concept of the light spectrum is thereby defined as distribution of irradiance (average energy per unit time per unit area) according to vibration frequencies, which is similar to the situation of observing the sun, the moon, remote stars, and radio/TV towers.

Figure 6:
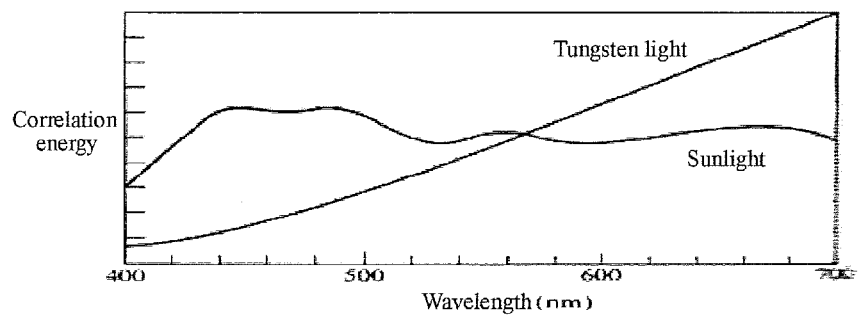
FIG. 6 is a comparison between a time spectrum of sunlight and a time spectrum of tungsten light.

According to the conventional spectroscopy, a concept of the light spectrum is thereby defined as distribution of irradiance (average energy per unit time per unit area) according to vibration frequencies. FIG. 6 shows a comparison between distribution of sunlight and distribution of tungsten light.

2. Pinhole imaging: in a situation when $t=t_0$, and for a point in the space $x=x_0$, $y=y_0$, and $z=z_0$, Formulas (1) to (4) can be simplified as:

$$I(x_0, y_0, z_0, t_0) = f^*f = |f(x_0, y_0, z_0, t_0)|^2 \quad (15)$$

$$f(x_0, y_0, z_0, t_0) = \int\int\int\int_{-\infty}^{+\infty}\int F(k_x, k_y, k_z, v) \quad (16)$$
$$\exp[j2\pi(k_x x_0 + k_y y_0 + k_z z_0 + vt_0)]dk_x dk_y dk_z dv$$

$$I(k_x, k_y, k_z, v) = F^*F = |f(k_x, k_y, k_z, v)|^2 \quad (17)$$

$$F(k_x, k_y, k_z, v) = \quad (18)$$
$$f(x_0, y_0, z_0, t_0)\exp[-j2\pi(k_x x_0 + k_y y_0 + k_z z_0 + vt_0)].$$

Figure 7:
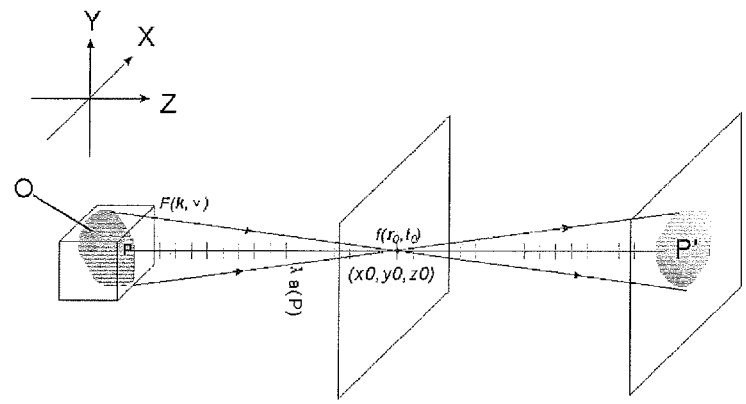
FIG. 7 is a schematic view of a wave function at a point ($x_0$, $y_0$, $z_0$) in space.

The situation, as shown in FIG. 7, is equivalent to a pinhole imaging process, and in this case the wave function seems to be a Dirac delta function $\delta(x-x_0, y-y_0, z-z_0, t-t_0)f(x,y,z,t)$ expressed by Formula (16) at a pinhole. Formula (18) is a typical expression of a delta function fourier transform at $(x_0,y_0,z_0,t_0)$, displacement from $(0,0,0,0)$ to $(x_0,y_0,z_0,t_0)$ of the delta function in a space-time coordinate is transformed into a phase shift $\exp[-j2\pi(k_x x_0+k_y y_0+k_z z_0+vt_0)]$ thereof in a frequency spectrum coordinate. Formula (16) means that energy contribution of an object O to the point $(x_0,y_0,z_0)$ or $r_0$ at time $t_0$ is superposition of a series of monochromatic plane waves of different vibration frequencies $v$ at the point in different propagation directions k, which is clearly shown in a vector expression (19) of Formula (16), where k is a vector variable with both the magnitude and direction changing, and $r_0$ may be contained inside the object.

$$f(r_0, t_0) = \int\int_0^{+\infty} F(k, v)\exp[-j2\pi(k\cdot r_0 + vt_0)]dkdv \quad (19)$$

$$F(k, v) = f(r_0, t_0)\exp[-j2\pi(-k\cdot r_0 + vt_0)] \quad (20)$$

Figure 8:
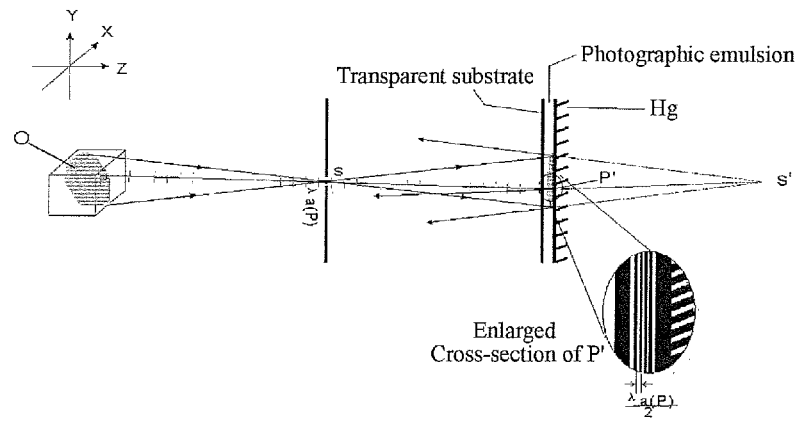
FIG. 8 is a schematic view of principles of the Lippmann color photography.

In FIG. 7, for photons emitted from each point P on a studied object, only photons along a connecting line between P and $(x_0,y_0,z_0)$ can reach the studied point to provide energy for the point. The connecting line is regarded as "a light beam", which is formed of photons in different energy states or of different vibration frequencies, but propagating strictly in the same spatial direction. In the present invention, photons propagating in the same spatial direction are defined as a spatial spectrum of light (a concept of which is described below in detail), and a 2D color photo formed by pinhole photographing according to the principle of the Lippmann color photography shown in FIG. 8 is a physical manifestation of the spatial spectrum of light. Each point in the photo corresponds to an interference optical filter, and the photo is formed of interference fringes formed by the average wavelength $\lambda_a(P)$ between an object point and a mirrored point thereof.

3. The conventional holography: when monochromatic illumination is considered, that is $v=v_0$, Formulas (1), (2), (3), and (4) are simplified as:

$$I(x, y, z) = f^*f = |f(x, y, z)|^2 \quad (21)$$

$$f(x, y, z) = \quad (22)$$
$$\int\int\int_{-\infty}^{+\infty} F(k_{0x}, k_{0y}, k_{0z})\exp[j2\pi(k_{0x}x + k_{0y}y + k_{0z}z)]dk_{0x}dk_{0y}dk_{0z}$$

$$I(k_{0x}, k_{0y}, k_{0z}) = F^*F = |F(k_{0x}, k_{0y}, k_{0z})|^2 \quad (23)$$

$$F(k_{0x}, k_{0y}, k_{0z}) = \quad (24)$$
$$\int\int\int_{-\infty}^{+\infty} f(x, y, z)\exp[-j2\pi(k_{0x}x + k_{0y}y + k_{0z}z)]dxdydz$$

the vector expressions (5), (6), (7), and (8) are simplified as:

$$I(r) = f^*f = |f(r)|^2 \quad (25)$$

$$f(r) = \int_0^{+\infty} F(k_0)\exp(j2\pi k_0 \cdot r)dk_0 \quad (26)$$

$$I(k_0) = F^*F = |F(k_0)|^2 \quad (27)$$

$$F(k_0) = \int_0^{+\infty} f(r)\exp(-j2\pi k_0 \cdot r)dr \quad (28)$$

Figure 9:
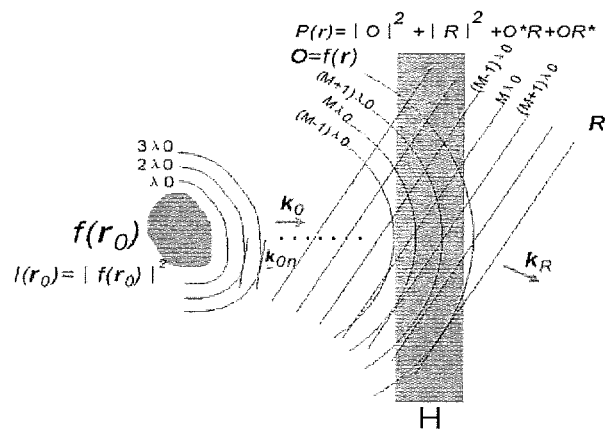
FIG. 9 is a schematic view of equiphase surfaces and a hologram of an object O.

The situation, as shown in FIG. 9, is similar to a situation in the conventional holography, in which a laser beam with a wavelength satisfying $\lambda_0=1/k_0$ illuminates an object. $k_0$ is a norm vector variable that only changes in direction, and integral tracks of k in FIG. 3 is a closed spherical surface with the radius being $k_0$, so that Formula (26) indicates that the wave function $f(r)$ is superposition of a series of monochromatic plane waves $F(k_0)\exp(j2\pi k_0 \cdot r)$ with propagation vectors being $k_0$ and in all spatial directions. Integration of $k_0$ from 0 to $+\infty$ is because r may be in the object. Therefore, the wave function in the location is superposition of all the monochromatic plane waves of the entire object in all the spatial directions. A Fourier transform $F(k_0)$ of the wave function $f(r)$ represented by Formula (28), that is, the distribution of the monochromatic plane waves of the wave function in a spatial direction, also depends on the contribution of each point r on any closed curved spatial surface of the wave function shown in FIG. 3 in the direction. Integration of r from 0 to $+\infty$ is also because that r may be in the object. It is assumed that $r_0$ is a position vector on the surface of the object, $f(r_0)$ is a wave function of photons emitted from the surface of the object, $I(r_0)=|f(r_0)|^2$, and the time is irrelevant, so that $f(r_0)$ may also be called a complex amplitude of the object. A light wave emitted from the object may be described as the probability amplitude of photons with the same phase, because all the photons are from the same object. In FIG. 9, equiphase surfaces of the probability amplitude of the so called photons with the same phase extend outwards in a normal direction of each the point on the surface of the object, and the distance between the equiphase surfaces is an integral multiple of $\lambda_0$. The points without normal lines are connected by arcs centered by the points, and the radius of the arc is also an integral multiple of $\lambda_0$.

The so called equiphase surfaces expressed by Formulas (25) to (28) really exist objectively, are independent on time, and may also be called complex wavefronts of the object. Each point on the equiphase surface has an amplitude $|f(r_0)|/m\lambda_0$ and a phase $2\pi m\lambda_0$ corresponding to a point $r_0$ on the surface of the object, and $$f(r_0) = \int_0^{+\infty} F(k_0)\exp(j2\pi k_0 \cdot r_0)dk_0 \quad (29)$$

which is superposition of a series of monochromatic plane waves $F(k_0)\exp(j2\pi k_0 \cdot r_0)$ at $r_0$, and when propagation is in the surface normal directions of the object, Formula (29) may be written as:

$$f(r_0)=F(k_{0n})\exp(j2\pi k_{0n} \cdot r_0) \quad (30)$$

Obviously, Formula (30) is only a component of a series of emitted monochromatic plane waves with $r_0$ being a point light source, where $K_{0n}$ is a propagation vector of a monochromatic plane wave propagating at $r_0$ on the surface of object in the normal direction, and determines the formation of the equiphase surfaces of the object.

Although discrete energy distribution $I(r)$ defined by illumination intensity $I(r_0)$ and corresponding spatial distribution of the illumination intensity $I(r_0)$ and emitted from the object may be expressed by Formulas (25) to (28), and with the current science and technologies, the computation and measurement are very difficult due to the complexity and precision thereof. However, when monochromatic plane waves R with the same vibration frequency $v_0$ and the same vibration direction, propagating in a $k_R$ direction, and called a reference beam are simply introduced as shown in FIG. 9, the wavefronts of the object can be holographically recorded by the holography. Complex energy distribution $P(r)$ formed by interference fringes generated by a series of sections formed by the intersecting wavefronts of the studied object O expressed by a series of parallel planes at the interval of $\lambda_0$ and Formula (21) is represented by:

$$P(r) = (O+R)(O+R)^* \quad (31)$$
$$= |O|^2 + |R|^2 + O^*R + OR^*$$

which is referred to as a hologram H of the object O when Formula (31) is recorded properly. When the original reference beam R is used to illuminate H, the wavefronts of the studied object O are completely restored, that is, the superposition of the corresponding monochromatic plane waves emitted from each point of the object and expressed by Formula (29), which is the equiphase surfaces of the object O shown in FIG. 9, so that the illumination intensity $I(r_0)$ and the corresponding spatial distribution $f(r_0)$ of the illumination intensity $I(r_0)$ of the described object O are directly restored.

Figure 10:
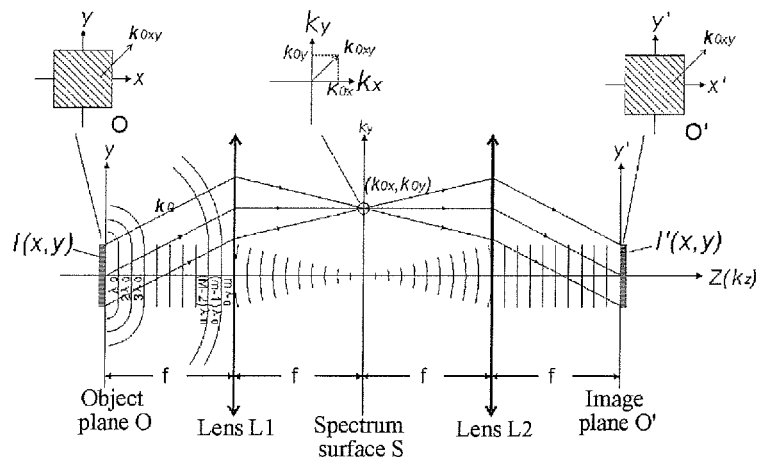
FIG. 10 is a schematic view of equiphase surfaces and 4f system imaging of 2D discrete energy distribution.

4. Conventional Fourier optics: when an object is illuminated monochromatically ($v=v_0$), and 2D discrete energy distribution is $I(x,y)$, Formulas (16) to (18) are written as:

$$I(x,y) = f^*f = |f(x,y)|^2 \quad (32)$$

$$f(x,y) = \int\int_{-\infty}^{+\infty} F(k_{0x},k_{0y})\exp[j2\pi(k_{0x}x+k_{0y}y)]dk_{0x}dk_{0y} \quad (33)$$

$$I(k_{0x},k_{0y}) = F^*F = |F(k_{0x},k_{0y})|^2 \quad (34)$$

$$F(k_{0x},k_{0y}) = \int\int_{-\infty}^{+\infty} f(x,y)\exp[-j2\pi(k_{0x}x+k_{0y}y)]dxdy \quad (35)$$

which combines with a 4f imaging system to form the basics of Fourier optics, clearly defines an object plane, a spectrum plane, and an image plane, and introduces a modulation transfer function (MTF), an angular spectrum $k_{0xy}$, spatial frequencies ($k_{0x},k_{0y}$), and spatial filtering, so as to improve the imaging quality of the imaging system. FIG. 10 illustrates equiphase surfaces in the case, where an image O' is formed by information ($k_{0x}$, $k_{0y}$) of different spatial frequencies. The information is obtained by regarding an object O captured by the imaging system as a series of monochromatic plane waves in different directions generated by an angular spectrum (a grating)/$k_{0xy}$.

II. Concepts of Time Spectrum and Spatial Spectrum Proposed in the Present Invention 1. Time Spectrum of Light A time spectrum of light has the same meaning as a light spectrum in the modern spectroscopy, is therefore defined as a distribution function $I(v)$ of radiation intensity of electromagnetic waves in relation to vibration frequencies of the electromagnetic waves, and may also be understood as frequency components forming the electromagnetic radiation. Within light spectrums of communication carriers such as ratio waves, microwaves, and an infrared laser beam, radiation intensity can be regarded as the power of an emission source of the communication carrier, since the energy distribution of the communication carrier is independent of spatial parameters, as shown in Formulas (11) to (14).

Within a narrow spectrum of visible lights, the radiation intensity corresponds to presentation of colors, that is, spectral colors corresponding to the vibration frequencies as shown in Table 1. The colors are not the characteristics of the light itself, but are specific manifestations made by an electrochemical sensing system including the eyes, nerves, and brain. Although a laser that can continuously adjust output power or energy according to varying vibration frequencies of the light is not invented yet, we can restore natural colors by superposition of three primary colors, and multiple kinds of lasers of the three primary colors are already available for selection. Actually, colors we can discern in nature are the distribution of discernable time spectrums, rather than the spectral colors shown in Table 1, so as to be richer than spectral colors represented by the Lippmann color photography. The three primary colors are used to restore colors of the colorful world for a long time, which brings the revolution of image display from black and white display to color display, and at the same time provides a simple method for humans to restore true colors in a 3D world. That is, superposition of laser beams of three primary colors red, green, and blue or more mono-spectrum colors is used to replace the integration of ν in Formulas (1) to (8), which is a research content of the current color holography.

TABLE 1

Mapping Table of Colors and Frequencies
TABLE 2.4 Approximate Frequency and Vacuum
Wavelength Ranges for the Various Colors

| Color | $\lambda_0$ (nm) | ν (THz)' | Color | $\lambda_0$ (nm) | ν (THz)* |
|---|---|---|---|---|---|
| Red | 780-622 | 384-482 | Green | 577-492 | 520-610 |
| Orange | 622-597 | 482-503 | Blue | 492-455 | 610-659 |
| Yellow | 597-577 | 503-520 | Violet | 455-390 | 659-769 |

*1 terahertz (THz) = $10^{12}$ Hz, 1 nanometer (nm) = $10^{-9}$ m.

2. Spatial Spectrum of Light

A spatial spectrum of light in the present invention is defined as a distribution function of radiation intensity of electromagnetic waves in a spatial propagation direction of the electromagnetic waves, that is a Poynting vector distribution function I(k) of light, which may also be understood as radiation intensity projection distribution of a luminous object in a certain spatial direction, that is, a vividly manifested 2D image of the object. Referring to Formulas (5) to (8) and FIG. 7, such a conclusion may be easily understood as follows. A wave function or probability amplitude $f(r,t)$ of discrete energy probability distribution I(r,t) is superposition of a series of monochromatic plane waves F(k,ν)exp[j2π(−k·r+νt)] in different directions and of different vibration frequencies, which come from a point P on a surface of a studied object. The object has the radiation intensity $I(r_p)=|f(r_p)|^2$, $f(r_p)$ is a complex amplitude of the object surface. Each point on the object corresponds to an average wavelength $\lambda_a(P)$ of a time spectrum of the point. For further convenience of understanding, the same meaning of a spatial spectrum of light can be expressed in the following three manners.

Figure 11:
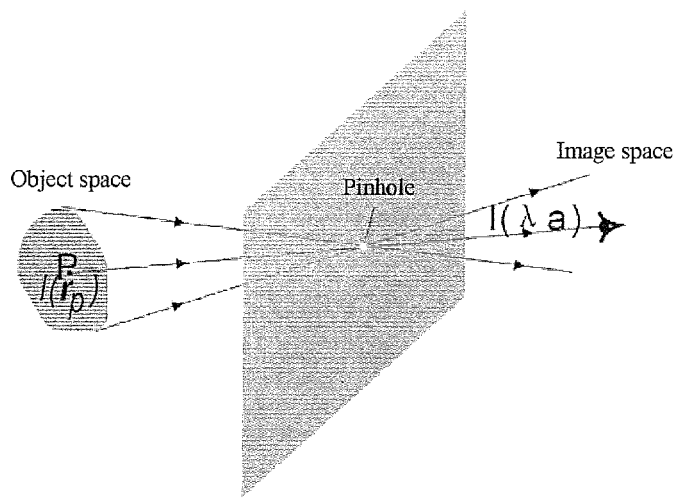
FIG. 11 is a schematic view of pinhole imaging.

(1) According to the theory of geometrical optics, a spatial spectrum of a studied object is defined as a view thereof passing through a pinhole, which is manifested as a pinhole image of the object shown in FIG. 11. In the object space, the pinhole is a black hole, and always absorbs light from the object, thereby forming an image of the object. In the image space, the pinhole is a point light source, which bears time spectrum information of the object. In other words, when we observe the pinhole in the image space, we can discern a change of the light intensity $I(\lambda_a)$ on the pinhole when an observation direction is changed, and the change corresponds to the light intensity $I(r_p)$ and an inherent average wavelength $\lambda_a(p)$ of a corresponding point on the object. When we move near the pinhole, the view of the object gradually presents more and more details until human eyes receive all light beams passing through the pinhole, in which case the entire object is viewed clearly. In fact, the principle of pinhole imaging is from a basic law of the geometrical optics, that is, the theory of rectilinear propagation of light. Lenses introduced in cameras and video cameras for imaging are only for collecting more light beams through light focusing characteristics thereof to make the imaging easier to be realized, which brings up the concepts of the object plane and the image plane and an imaging formula generated based on the same basic principle, in which case the pinhole is replaced by a center point of the lens, and more light beams restricted by a lens aperture and front/rear focuses of the lens aperture participate in the imaging. Although an imaging process of the lens is three-dimensional, an actual output of the imaging is still restricted to 2D light intensity distribution on a corresponding image plane, and combines with the three primary colors to form a high quality color photo or even a current high resolution digital image. It can be said that, all displayed image information acquired by humans from the nature is so far only a spatial spectrum of the world we can perceive.

(2) According to the theory of wave optics, a spatial spectrum of a studied object is defined as a set of monochromatic plane waves propagating in the same spatial direction but of different vibration frequencies, which can be represented by imaging of the object acquired by an imaging system in the direction. Actually, the definition is only a theoretical definition of the spatial spectrum as that of the monochromatic plane wave in the wave optics and the pinhole in the geometrical optics. A pinhole in a holographic experiment is the detailed manifestation and verification of a single spatial spectrum and a single time spectrum, which is used to "clean" the "stains" on laser beam speckles amplified by a beam expander. The Fourier optics expressed by Formulas (32) to (35) and FIG. 10 provide a precise explanation of an imaging process, which though only involves a monochromatic light vibrating in a certain frequency. A spatial frequency $(k_{0x}, k_{0y})$ is spatial density of intersecting lines of a spatial spectrum corresponding to the monochromatic light and a spatial spectrum in an imaging direction (herein a Z direction).

(3) According to the quantum optics, a spatial spectrum of a studied object is defined as the discrete energy distribution formed by photons in different energy states emitted in the same direction, which can be vividly represented by light intensity of a surface of the object being mathematically projected to a plane in parallel, and can be regarded as an effective representation of momentum states p of photons in different energy states ϵ in the same direction.

III. Concept of Hoxel Proposed in the Present Invention and Relationship Between Hoxel and Spatial Spectrum Actually, Formulas (5) to (8) provide two basic expressions of the nature using photons, which is the most precise manifestation form of the nature, and meanwhile provide an internal relationship of an eternal theme concerning wave-particle duality of the light.

Figure 12:
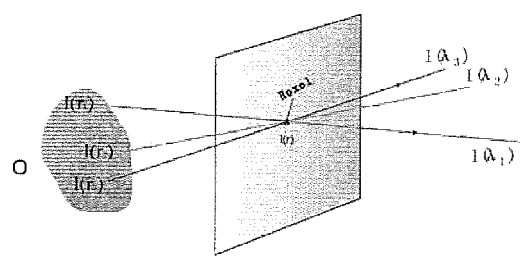
FIG. 12 is a schematic view of definition of a hoxel.

1. Formulas (5) and (6) provide a particle language or a space-time language for describing the nature. In the language, discrete energy probability distribution I(r,t) of a point in space-time results from the superposition of monochromatic plane waves F(k,ν)exp[j2π(−k·r+νt)] in different directions and formed of many photons in the same state, as shown in FIG. 12. The point is defined as a hoxel of the natural object, and is verified by the Lippmann color photography (which herein refers to a physical meaning of the hoxel, that is, an inherent energy distribution law of the hoxel, which is already verified by the famous Lippmann color photography). In the present invention, each light beam is regarded as a monochromatic plane wave corresponding to an average wavelength $\lambda_n$ of the radiation intensity $I(r_n)$ of a point on an object, so that a color presentation incurred by an interference optical filter is generated on a corresponding point on a Lippmann color photo.

Figure 13:
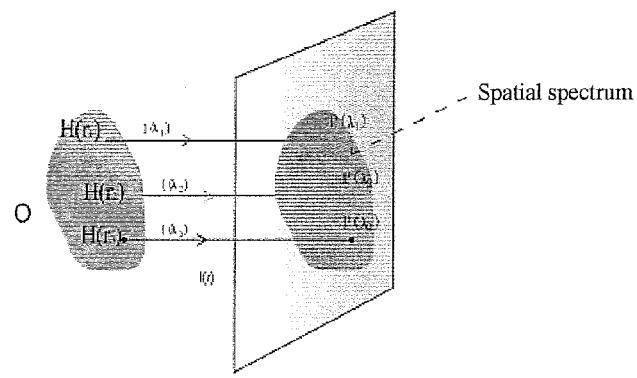
FIG. 13 is a schematic view of definition of a spatial spectrum.

2. Formulas (7) and (8) provide a wave language or a spectrum language for describing the nature. In the language, discrete energy probability distribution $I(k, v)$ from an object in the same direction is formed by superposition of many hoxels near the object according to different spatial positions. As shown in FIG. 13, the hoxels $H(r_n)$ represented by $f(r,t) \exp[-j2\pi(-k \cdot r+vt)]$ emit respective photons thereof in the same state in the same spatial direction, which form a 2D radiation intensity pattern $P(\lambda_n)$ of the object in the direction. The radiation intensity pattern is a spatial spectrum of the natural object defined herein, which is realized by a pinhole imaging process shown in FIG. 12, and is improved by modern information technologies to be a digital form high definition 2D color image.

3. When the size of each hoxel is decreased to the scale of a photon, that is, discrete sampling performed on the nature satisfies the Heinsberg's uncertainty principle of the photon, the spatial spectrum is still a monochromatic plane wave strictly formed of photons in the same sate. The fact is verified by the holography, because wavefronts of a complex object in the holography is formed by superposition of a series of monochromatic plane waves, and the monochromatic plane waves are recorded and reproduced in the form of a hologram acquired through interference fringes.

Figure 14:
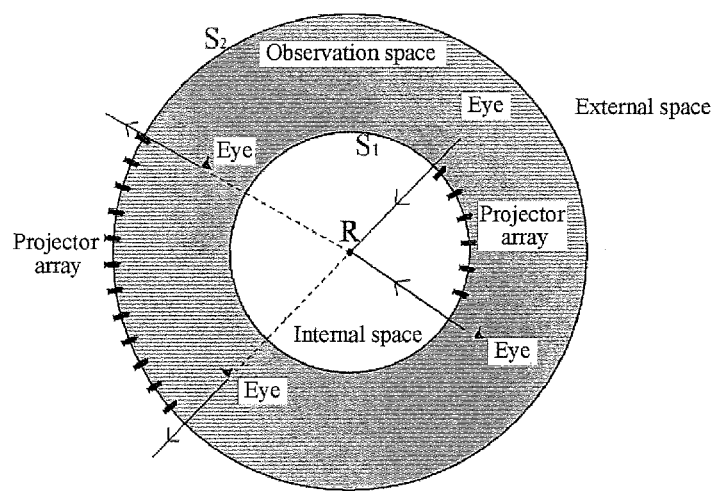
FIG. 14 is a schematic view of using spatial spectrum languages on two closed curved surfaces to process visual information of the nature faced by human beings.

4. As shown in FIG. 14, a spatial spectrum language on two closed curved surfaces may be used to process the visual information in the nature faced by humans. That is, humans view inwards through a hoxel on a curved surface S1, and view outwards through a hoxel on a curved surface S2. In the same way, visual information, no matter inwards or outwards, can be placed on the curved surface S1 or S2 in the form of an array, and M×N independent photographing-projection devices anchored at the same reference point R capture and restore the spatial spectrum. The anchoring refers to that the imaging optical axes of all the independent photographing-projection devices converge at the same point.

IV. New Description of Light in the Present Invention Based on the Above New Concepts Radiation intensity is currently the only measurable parameter of the electromagnetic radiation, which is the only manifestation form of light in a visible light range, that is, light intensities of all photon states. A time spectrum and a spatial spectrum of light are already defined, the time spectrum corresponds to the distribution function $I(v)$ of the radiation intensity in relation to the vibration frequency, and the spatial spectrum corresponds to the distribution function $I(k)$ of the radiation intensity in relation to a light propagation direction. A detailed explanation of 3D manifested reality presented by the nature due to existence of light is given herein by using the concept, so as to find a reasonable method to restore the reality by using the modern science and technology.

Figures 15A, 15B, 15C:
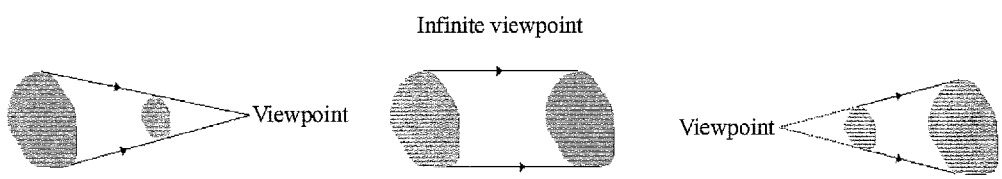
FIG. 15 is a schematic view of three perspective manners.

It is assumed that an object O is formed of all spatial manifestation forms in the nature, which may be the earth, the moon, the sun, or any other celestial bodies, or even the entire universe, and the spatial manifestation forms radiate electromagnetic energy actively or passively. The object O may be any artificial light source, or any other self-luminous materials, or the world on which our life depends made by an effect of "a new radiation source" or "a black hole" generated simultaneously when photon states of the light are illuminated by any other material form. Mathematically speaking, it can be traced back to the invention of perspective made by Filippo Brunelleschi, an Italian architect in the middle of the fifteenth century. As shown in FIG. 15, a perspective view of the object O can be acquired in the three manners, which are physically realized by using a pinhole or a lens, and are developed into high-quality digital cameras today under the guide of the wave optics and the Fourier optics. Each point on the object O at least corresponds to a corresponding point in a view of the object in one direction. A point shown on each view corresponds to a foremost point of the object in the view direction.

Figure 16:
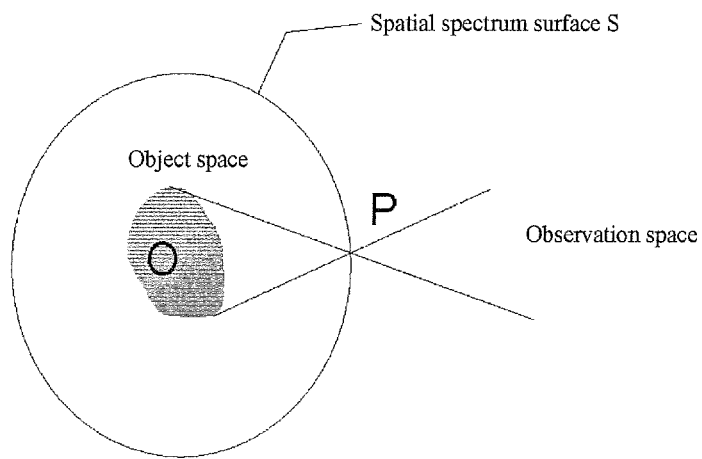
FIG. 16 is a schematic view of an object space, a spatial spectrum surface, and an observation space.

It is assumed that another closed curved surface S surrounds the object O, and the S is defined as a spatial spectrum surface of the object O, because a complete spatial spectrum of the object is completely contained in a view of O represented by each point P on the S. Theoretically, the S may be a plane, a cylindrical surface, a spherical surface or any other curved surfaces of any shapes, which can be used as a sampling surface for capturing a corresponding spatial spectrum. Similar to an imaging process of an ordinary lens, space inside the S is defined as the object space, and space outside the S is defined as the observation space, as shown in FIG. 16. When the point P on the S is considered, the observation space changes into the so called image space, in which the corresponding spatial spectrum of the object O forms an image of the corresponding view of the object O in the observation space, and when an imaging system is introduced, an image photo is manifested on the image plane. The function of the imaging system is to actually acquire the photo of the view, because the imaging system can capture more light beams than the pinhole, and in this case the pinhole changes into an aperture stop. Therefore, no matter what size of an aperture is used in a system to capture more object information, a finally acquired result of the view is only a photo of the view focused by the system on a corresponding plane of the object, and the resolution of the photo depends on the inherent Airy disc of the imaging system. The photo is still an expression of a single spatial spectrum of the studied object in one direction, and the 3D characteristics thereof are indirectly manifested as different focuses of the imaging system in the same direction and in a tomographic manner. Actually, a single spatial spectrum captured on each point P on the surface S can eventually be manifested by a high-quality image incurred by the imaging system focusing a fixed point inside the object O, which is 2D discrete energy distribution determined by the Airy disc. The following proves that a captured complete spatial spectrum of the studied object O can be used to restore the 3D display of the object information.

Figure 17:
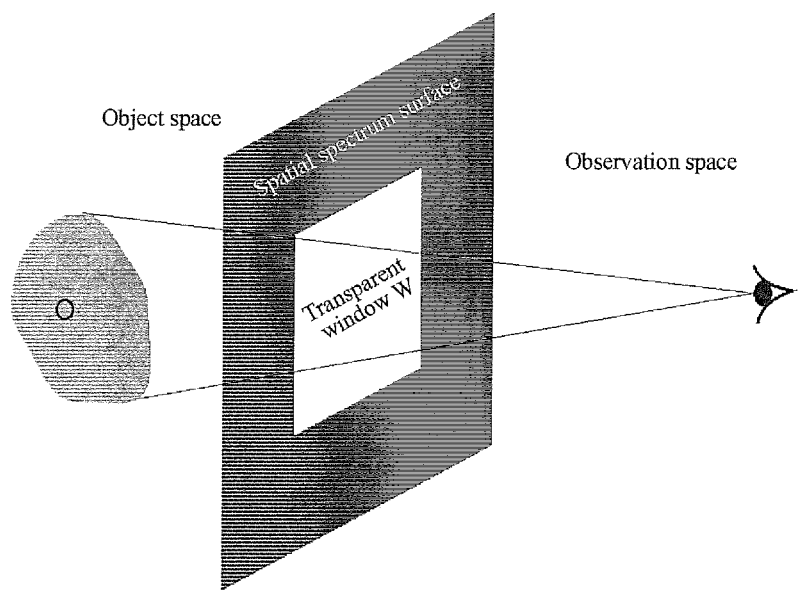
FIG. 17 is a schematic view of a plane spatial spectrum surface.

A simple experiment is used to express how humans perceive and restore a 3D manifestation of the studied object O. In order to simplify the analysis and make the process easier to be understood, it is assumed that the spatial spectrum surface S is a plane, which is similar to the case in which humans view the studied object through a transparent glass window in the observation space, as shown in FIG. 17.

Figure 18:
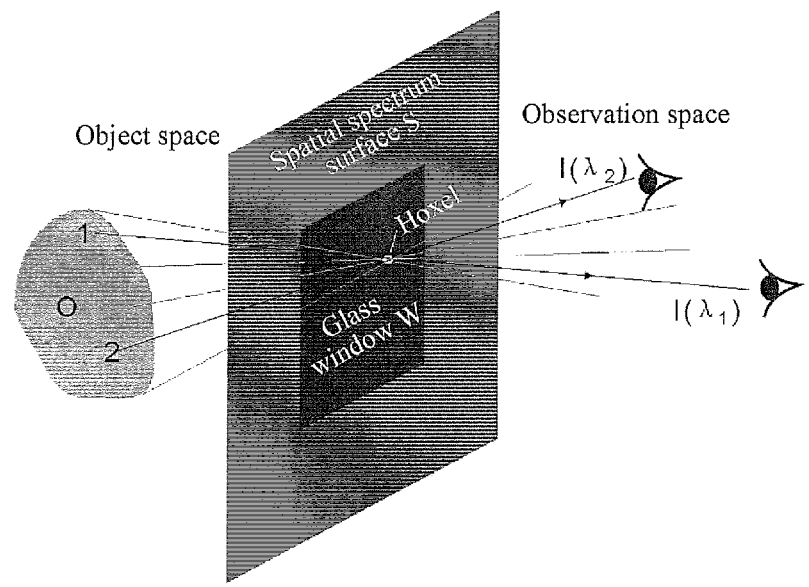
FIG. 18 is a schematic view of a hoxel.

It is assumed that a virtual pinhole is placed at the virtual glass window, as shown in FIG. 18. The virtual pinhole may be regarded as the spatial spectrum sampling of the studied object, the size of which may be determined by the resolution capability of a corresponding detector (for example, human eyes). The virtual pinhole is called "a hoxel" of the studied object O, and has an English name "hoxel", which is a specific physical manifestation of Formula (6) at the point. That is, a wave function of the hoxel is superposition of a series of monochromatic plane waves emitted from the object O. In the observation space, the pinhole can only be recognized as a point light source of white light, although the information of the object is already coded inside through the pinhole as a view of the object. By observing the pinhole carefully, it is found that a color and brightness of the point light source change as we move up and down, left and right in the observation space. That is, the spatial spectrum of a hoxel varies according to a spatial direction, which is a specific physical manifestation of Formula (8) at the point. If we scan the entire glass window by moving the pinhole according to video speed, it is found that the studied object is presented in a 3D form, which is similar to that we directly open the glass window, and place a layer of checkers as big as a pinhole referred to as hoxels on the window. The checkers correspond to pixels in a 2D digital image. In other words, by restoring an original spatial spectrum expression corresponding to each hoxel on the glass window, we can see a 3D manifestation of the studied object through the glass window. Herein, each hoxel is associated with a view thereof in the same perspective manner as the original object O. That is, the hoxel is a view point of the object O. Definitely, the "glass window" may be any curved surface with a certain thickness, which may have any shape, be at any place, and even intersect with the object, rather than only a thin plane with a certain distance away from the object. On the invisible and intangible "glass window", only the hoxels exist, and the hoxel acts as a "black hole" for the object space, and acts as a "new radiation source" for the observation space, which carries perspective information of the studied object O. Therefore, the hoxel may be regarded as spatial sampling information of the discrete energy distribution of photons emitted from the studied object O, and exist anywhere in the entire space, and actually exits although the hoxel is invisible and intangible, which is very similar to the displacement current density assumed in the famous Maxwell's equations, and in the assumption the objective existence of the electromagnetic wave is mathematically deduced and described. The physical manifestation of the hoxel can be realized by sampling and restoring a spatial spectrum on a curved surface in the space, so as to restore 3D reconstruction and display of the studied object O.

Energy information converged on the hoxel is technically expressed in a material space distribution manner in the same state in the following two different manners.

1) Light intensity spatial distribution directly projected by corresponding points on the studied object through the hoxel detected on a photosensitive material or device forms a photo of the object.

2) If time spectrum sampling is performed on the object (the object only reacts to a single time spectrum, or is illuminated by a laser beam with sufficient temporal coherence), and once a reference beam is introduced on the hoxel and a spatial spectrum of the reference beam is not included in all spatial spectrums of the object contributing to the hoxel, a Fourier transform hologram of a corresponding view of the object is formed when the energy distribution on the hoxel is recorded by a suitable photosensitive material or device, which is a basic unit of the current holographic data storage and digital holographic printing technologies. Actually, if interpreted according to the spatial spectrum theory of the present invention, the holography is the first practical technology using coherent interference of lightwave to restore the 3D spatial information in the form of a complete spatial spectrum, and the digital holography digitalizes the process and holographically prints independent holographic pixels.

The following conclusions can be obtained to describe the light acting as a basic carrier of information of the nature.

1) Information provided by the nature for the human beings is actually 4D or holographic, which consists of a time spectrum and a spatial spectrum generated by sampling photons. Discrete energy distribution of photons in the universe is holographically manifested by a wave function or probability amplitude thereof through a complete spatial spectrum and time spectrum thereof, and a specific manifestation form thereof, the hoxel, is holographically received and perceived by human beings with the brain.

2) The photography (the Lippmann color photography) technically realizes a physical manifestation form of energy distribution of a complete time spectrum (color) by using a single spatial spectrum (a pinhole camera), that is, a color photo of a view of the universe in a direction, which forms the civilization foundation of displaying a 2D image achieved by a 1D processing manner of an electronic signal.

3) The holography technically realizes a physical manifestation form of energy distribution of a complete spatial spectrum (convolution of pinhole imaging on a spatial spectrum surface) by using a single time spectrum (a laser beam), i.e., a hologram.

4) The digital holographic real-time 3D display in embodiments of the present invention effectively combines modern electronic civilization and the future photon wisdom, so as to open the door of civilization transition from the electronic-information technology (e-IT) to the photoelectric-information technology (p-IT), enabling the human beings to stand on a starting line of marathon of civilization of the next generation, in which the space or vector of optical information (a Poynting vector) is processed holographically, rather than the time or scalar of a photoelectric pulse signal is still processed in a 1D manner which made an unprecedented success in the last century.

V. Implementation of Theories in the present Invention-Capturing and Restoration of Spatial Spectrum Based on Above Theories The theories in the present invention are described above, a holographic 3D display system and method of the present invention are illustrated below. The holographic 3D display system and method include photo capturing and projective restoration of spatial 3D information, and limited stretching performed by a special holographic functional screen during the projective restoration.

1. Capturing of Spatial 3D Information

Figure 19:
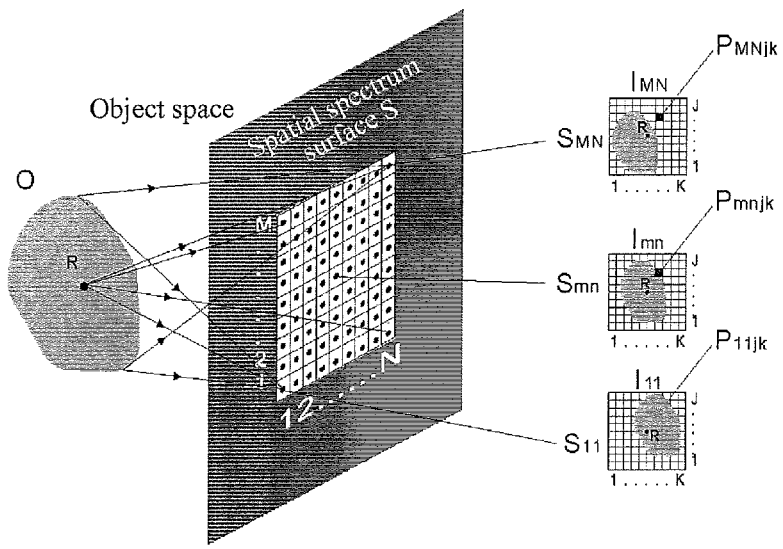
FIG. 19 is a schematic view of capturing a spatial spectrum.

In FIG. 17, a glass window is equally divided into M×N (M≥1, N≥1) small units, which is equivalent to spatial spectrum sampling performed on a studied object O on a spectrum surface S, as shown in FIG. 19. Definitely, the spectrum surface S may not be a plane, which depends on a final restoration method and manifestation manner of the 3D information. A center point $S_{mn}$ of each unit represents spatial spectrum sampling of the studied object O on the spectrum surface S, which corresponds to a view $I_{mn}$ of the object O, and according to the present invention, can be acquired by M×N digital video cameras of the same parameters at corresponding positions of the $S_{mn}$ on the spectrum surface S focusing on the same point R on the object O. The focal point R is named as a spatial reference point. M and N determine the 3D spatial restoration fidelity. In the conventional holography, M and N are surprisingly large, which are close to single photon quantum sampling, and makes the distribution of the spatial spectrum on the spectrum surface S almost continuous and even, thereby restoring the 3D space occupied by the object O as realistic as possible. For digital printing holography, all pixels $P_{mnjk}$ on M×N digital photos are separated and reorganized to form another set of spatial coding patterns capable of reflecting the original information thereof on the spectrum surface, so that a Fourier transform hologram of the pattern can be printed point by point to form corresponding digital holographic display. When M=N=1, it is equivalent to a conventional photographing and image capturing process corresponding to the current 2D display. When M=1 and N=2, it is equivalent to current stereoscopic photographing and binocular 3D imaging technologies. When M=1 and N>2, it is equivalent to HPO 3D imaging technologies in the following embodiments.

2. Restoration of Spatial 3D Information

Figure 20:
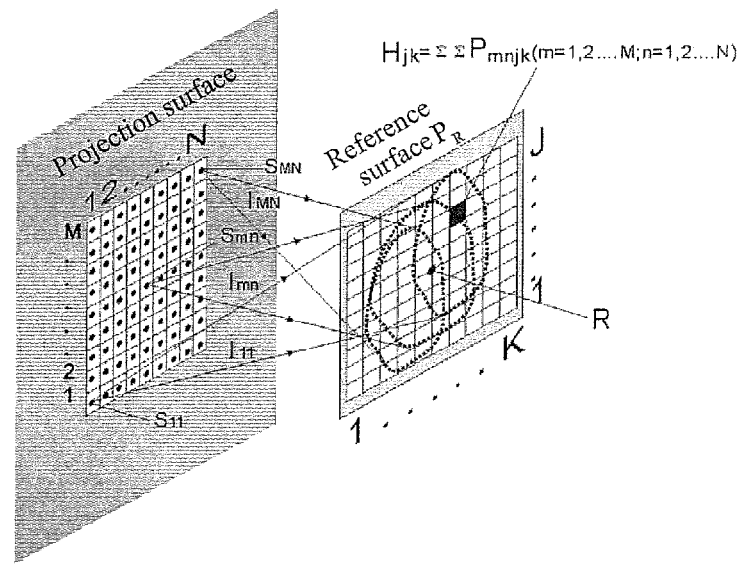
FIG. 20 is a schematic view of spatial 3D information restoration.

When the captured M×N views $I_{mn}$ of the object O are projected by M×N digital projectors of the same parameters to a plane corresponding to the original object O, the reference points R of the projected views overlap at the plane, and the plane is named as a reference surface $P_R$, as shown in FIG. 20. Definitely, the projection views $I_{mn}$ may be enlarged or downsized images of the original object O, and the reference surface $P_R$ may also not be a plane, which also depends on a final restoration method and manifestation manner of the 3D information. In FIG. 20, the distribution of the optical information on the reference surface $P_R$ is equivalent to restoration of the information of the original object O restored by M×N spatial spectrums on the spectrum surface S, and a specific process of which is manifested by a discrete Fourier transform derived from Formulas (5), (6), (7), and (8). Herein, the discrete process mainly comprises two parts: one is a digitization process of the involved views in the spatial spectrum sampling of the original object O, which is manifested by the number J×K of plane pixels of each digital image of the views, which is currently typically 1024×768; and the other is the number of the spatial spectrums required to be captured to restore the spatial 3D information of the original object O, which herein is M×N. Definitely, another discrete process involves time, which is color restoration incurred by the superposition of the three primary colors.

The reference surface $P_R$ is decomposed into J×K hoxels $H_{jk}$, which are as big as the plane pixels $P_{mnjk}$ of each spatial spectrum view of the original object O, and completely overlap the plane pixels $P_{mnjk}$ in ideal conditions. Basic characteristics and a manifestation of physical phenomena of distribution of the optical information on the reference surface $P_R$ are analyzed below.

Figure 21:
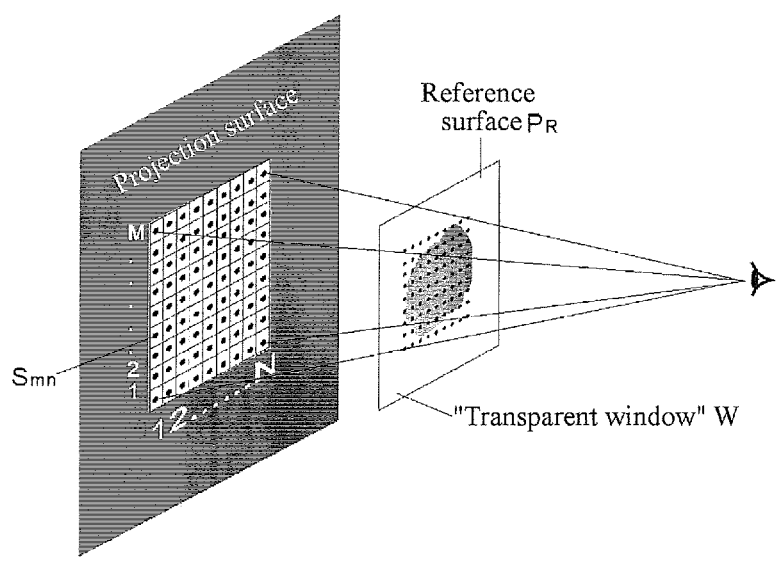
FIG. 21 is a schematic view of M×N point light sources seen by human eyes.
Figure 22:
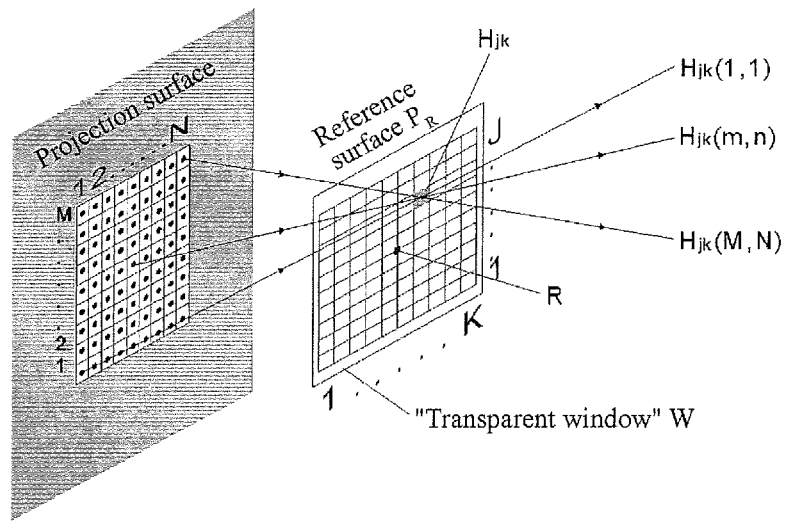
FIG. 22 is a schematic view of a discrete spatial spectrum on a hoxel.

1) If a transparent "glass window" as shown in FIG. 17 is placed on $P_R$, human eyes see M×N point light sources carrying object information through the "glass window", as shown in FIG. 21; and in this case, spatial spectrums of each hoxel $H_{jk}$ on $P_R$ are distributed in corresponding M×N directions discretely, as shown in FIG. 22. Therefore, when the spatial spectrum sampling density of M×N is near the number J×K of the pixels of each digital projection view, the 3D spatial information with the hoxels being J×K can be directly restored. However, according to the level of current information technologies, M×N is far smaller than J×K, so that although information of the M×N views with the number of the pixels being J×K is reflected on $P_R$ completely, the human eyes can only receive a small part of the M×N spatial spectrums of the original object O, which form the M×N point light sources carrying the object information.

Figure 23:
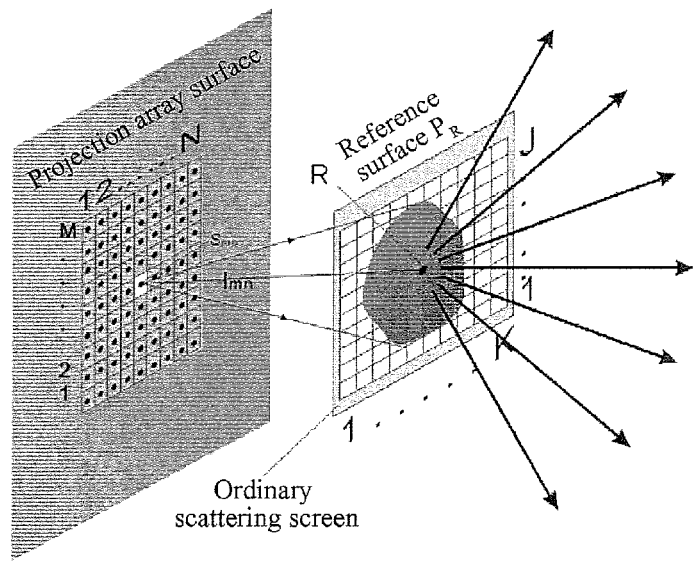
FIG. 23 is a schematic view of wide angle even stretching output of a spatial spectrum (input of a single spatial spectrum)
Figure 24:
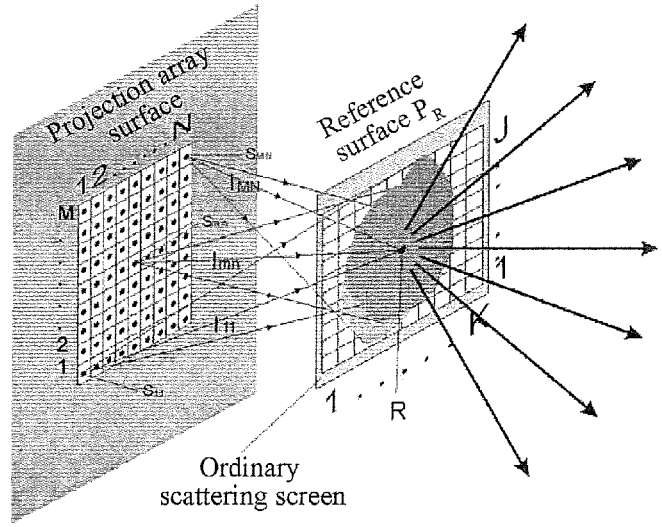
FIG. 24 is a schematic view of wide angle even stretching output of a spatial spectrums (input of M×N spatial spectrums)

2) If an ordinary diffuse scattering screen is placed on $P_R$, any single projection $I_{mn}$ of the M×N projectors displays a complete and clear view corresponding to a spatial spectrum direction of the object, that is, all characteristics of the current 2D display. A spatial spectrum corresponding to each plane pixel is converted from input in single direction by a small spatial angle into output in an evenly scattering by a big spatial angle, so that output spatial spectrum stretching of each plane pixel overlaps each other to form a considerable spatial observation range, as shown in FIG. 23. If M×N projectors simultaneously project clear views in corresponding M×N spatial spectrum directions, light intensities of the views of the plane pixel $H_{jk}$ at the position of the same hoxel $H_{jk}$ are inconsistent, so that superposition causes a pile of blurred overlapping images, as shown in FIG. 24. Therefore, in the modern digital image display technologies, the input is the single spatial spectrum input, no matter electricity or light. Each independent pixel of the image has a big observation angle with even stretching. That is, the same spatial spectrum information is input through narrowband and output through wideband, so that the color and brightness of each pixel in all spatial directions remain the same.

Figure 25:
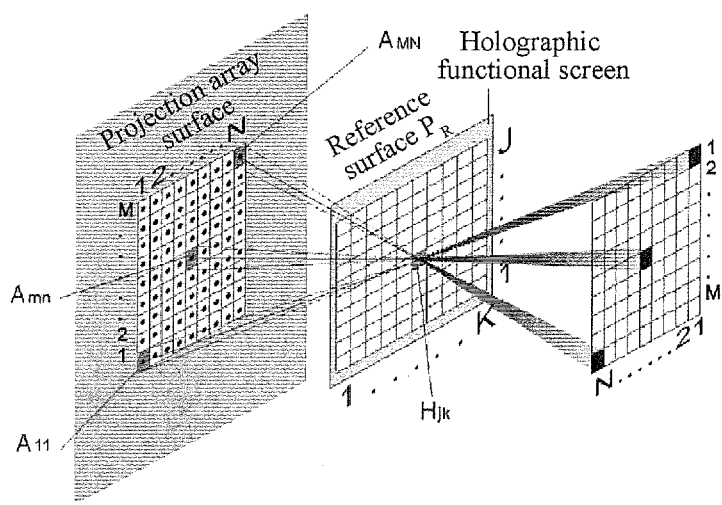
FIG. 25 is a schematic view of functional screen projection output.

3) If a functional display screen provided by the present invention is placed on $P_R$, and the function of the functional display screen is to exactly scatter the M×N point light sources carrying the object information seen in 1) into unit areas $A_{mn}$ occupied by the projectors, which are completely connected (or slightly overlap), so that the information of the M×N spatial views are connected to form an even light background on the spectrum surface, as shown in FIG. 25, and the output spatial spectrum of each hoxel $H_{jk}$ is consistent with the digital holographic printing, thereby realizing full parallax perfect 3D spatial information restoration. The restoration fidelity depends on the spatial spectrum sampling density determined by M×N.

Figure 26:
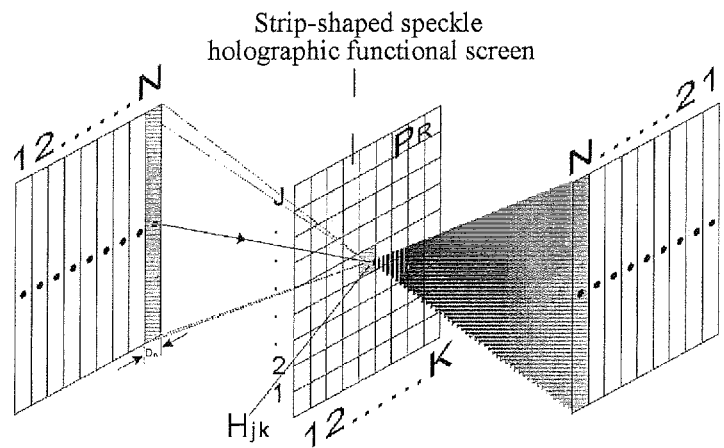
FIG. 26 is a schematic view of Horizontal Parallax Only (HPO) projection output.

4) When M=1, N>2, and a strip scattering screen with the level stretching being a sampling interval $D_{mn}$ is placed on $P_R$, HPO perfect 3D spatial information restoration can be achieved, as shown in FIG. 26.

3. Restoration Fidelity of 3D Spatial Information in the Present Invention

The Shannon's sampling theorem laid an important theoretical basis for the modern digital information age, and in combination with the Fourier transform theory, the newest achievements in the information technologies are acquired, such as modern digital signal communications and image processing, and even the digital holography. The influences of the spatial sampling angle $\omega_{mn}$ on the 3D spatial information restoration fidelity are discussed below.

1) As known, the angular resolution of human eyes is about $1.5\times10^{-4}$ radian, which means that in front of the nature sampled by photons, each eye of a human is like a spatial spectrum detector, and focuses and watches any point at will in the sea of hoxels with the angular resolution of the naked eye. In other words, if $\omega_{mn}=\omega_E$, all 3D spatial information discernable by a naked eye is restored perfectly and vividly, and a perfect and vivid spatial 3D information reconstruction can be acquired, which although seems rather remote, the basic ideas of the present invention in combination with researches of current nanometer technologies and materials lead to an effective realistic approach of realizing the future IT ultimate objective.

Figure 30:
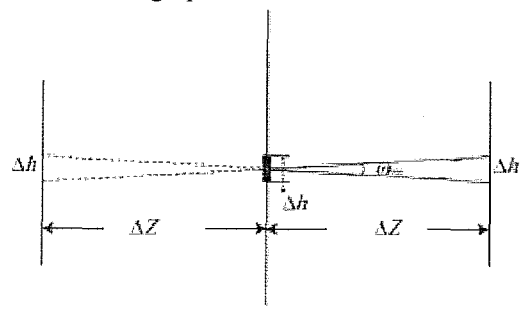
FIG. 30 is a schematic view of restoration fidelity.

2) If the spatial sampling angle satisfies $\omega_{mn} \gg \omega_E$, an ultimate criterion of clear display is that the size $\Delta h$ of the hoxel is the same as that of the plane pixel of each single spatial spectrum projection image on the holographic functional screen on the reference surface. As shown in FIG. 30, each point on the functional screen may be reasonably considered that the single spatial spectrum information thereof is emitted in the sampling spatial angle $\omega_{mn}$, and other information away from the functional screen is considered to be formed by speckles with a size being $\Delta Z \times \omega_{mn}$, in which $\Delta Z$ is the distance away from the front or rear of the functional screen. When $\Delta h = \Delta Z \times \omega_{mn}$, it may be considered that the spatial restoration capability of the size fidelity of the corresponding hoxel is:

$$2\Delta Z = 2\Delta h/\omega_{mn} \tag{36}$$

Table 2 shows results clearly, and helps to design any holographic 3D display project. Definitely, Table 2 is strictly based on the hoxel size, which can be enlarged by times during actual application.

TABLE 2

| $\Omega_{mn\,(red)}$ | $\Delta h_{(m\,m)}$ | | | | | |
|---|---|---|---|---|---|---|
| | 0.1 | 0.2 | 0.5 | 1 | 1.5 | 2 |
| $\pi/10$ | 0.6 | 1.2 | 3.0 | 6 | 9 | 12 |
| $\pi/20$ | 1.2 | 2.4 | 6 | 12 | 18 | 24 |
| $\pi/40$ | 2.4 | 4.8 | 12 | 24 | 36 | 48 |
| $\pi/90$ | 5.7 | 11.4 | 28.5 | 57 | 85.5 | 114 |
| $\pi/180$ | 11.4 | 22.8 | 57 | 114 | 171 | 228 |
| $\pi/360$ | 22.8 | 45.6 | 114 | 228 | 342 | 556 |
| $\pi/720$ | 45.6 | 92.2 | 228 | 556 | 684 | 1112 |

Accordingly, the present invention provides a color real-time holographic 3D display system, which comprises a photographing and capturing device of color real-time holographic 3D image information, a projective restoration device of real-time holographic image information, and a holographic functional screen.

The photographing and capturing device comprises M×N color 2D image capturing units $C_{mn}$, which are used to sample and capture M×N spatial spectrums on any spatial spectrum surface S of an object O to be displayed in a 3D manner, each sample point $S_{mn}$ corresponds to a hoxel $H_{mn}$ of the object O, and information captured by each image capturing unit $C_{mn}$ is equivalent to a spatial spectrum view $I_{mn}$ corresponding to the hoxel $H_{mn}$, so that M×N arrays of sample spatial spectrum image information of the object O are acquired. The M×N color 2D image capturing units $C_{mn}$ are arranged on the spatial spectrum surface S according to preset spatial sampling angles $\omega_{mn}$, and imaging optical axes thereof are anchored to the same reference point R of the space corresponding to the object O. Each image capturing unit focuses on a visible surface of the object O in the corresponding spatial spectrum direction to acquire the clear view $I_{mn}$ in the direction.

The projective restoration device comprises M×N color 2D image projection units $P_{mn}$, which are respectively used to simultaneously project the captured corresponding array sample view $I_{mn}$ at the M×N hoxels $H_{mn}$ to a reference surface $P_R$ in a restoration space corresponding to the original object O according to corresponding anchor relationships during the capturing, and make a projective pattern of each projective view image on the reference surface be consistent with a spatial spectrum projective pattern of the original object O in the direction. The M×N color 2D image projection units $P_{mn}$ are arranged on a corresponding surface S' of the spatial spectrum surface S in a restoration space according to the spatial sampling angles $\omega_{mn}$ same as those during the capturing, and imaging optical axes of the projection units s $P_{mn}$ are anchored on a corresponding point R' of the reference point R in the restoration space.

M, N, m, and n are natural numbers, and at least one of M and N is greater than 2.

The holographic functional screen is placed on the reference surface $P_R$, and is used to perform spatial spectrum stretching corresponding to the spatial sampling angles $\omega_{mn}$ on input information of the view $I_{mn}$, carried in each single spatial spectrum, so that after the stretching, output spatial spectrum distributions of the views $I_{mn}$ are connected to each other, but do not overlap, thereby ensuring that a digital holographic spatial spectrum of the restored 3D spatial information is restored and output continuously and completely. That is, for each hoxel $H_{jk}$ on the holographic functional screen, a stretching angle of a spatial unidirectional input light beam is exactly the spatial sampling angle $\omega_{mn}$, thereby achieving holographic 3D display intended to restore complex wavefronts.

Figure 27:
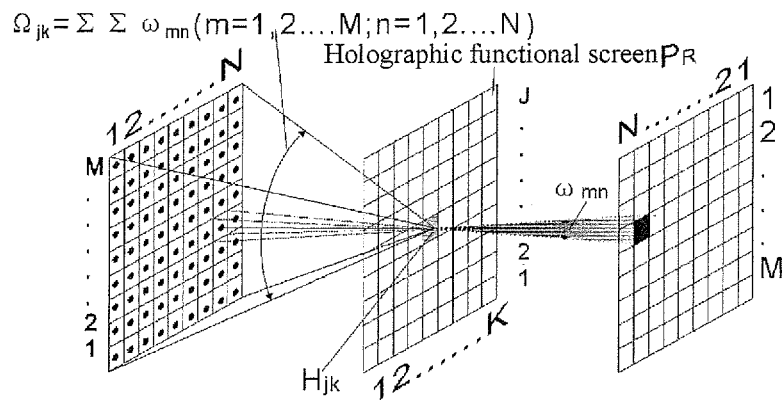
FIG. 27 is a schematic view of a relationship between stretching of a single spectrum and stretching of full spectrums.

It can be seen that, besides the features of the array sampling and projection of the spatial spectrum, another major feature of the present invention is a directional scattering function of the holographic functional screen. FIG. 27 is a schematic view of an output relationship between a single spatial spectrum and complete spatial spectrums of input discrete spatial spectrum information after passing through the holographic functional screen. The holographic functional screen has regularly distributed fine spatial structures. The distribution makes an input light beam reaching the holographic functional screen in any direction have a corresponding full spectrum spatial stretching output, and a spatial stretching angle thereof is the spatial sampling angle $\omega_{mn}$ necessary for restoring the specific spatial 3D information.

Figure 31:
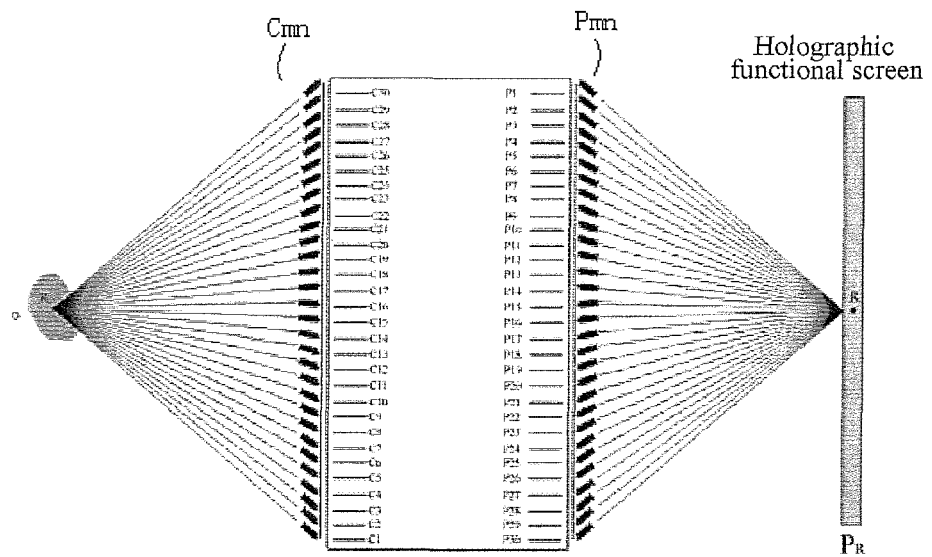
FIG. 31 is a schematic view of an experimental system according to the present invention.

In an embodiment, M=1 and N>2, as shown in FIG. 26, the holographic functional screen corresponds to a limited stretching angle $\omega_n$ in a horizontal direction, so that output spatial spectrum distributions of the views $I_n$ evenly arranged in the horizontal direction are fully connected to each other, and a scattering angle $\omega_n$ in a vertical direction is similar to an ordinary projection display, and is a considerable angle. That is, the holographic functional screen is a vertical directional scattering screen with limited stretching in the horizontal direction. FIG. 31 illustrates an application of the holographic functional screen in a color real-time holographic 3D image display system according to an embodiment, in which M=1 and N>2. That is, the limited stretching is only performed on the output spatial spectrum in the horizontal direction, in which $C_{mn}$ may also be represented as $C_n$, and $P_{mn}$ may also be represented as $P_n$.

The present invention further provides the following methods for manufacturing a holographic functional screen. Principles and manufacturing solutions of the holographic functional screen are as follows.

a) Directional Speckle Method

Figure 28:
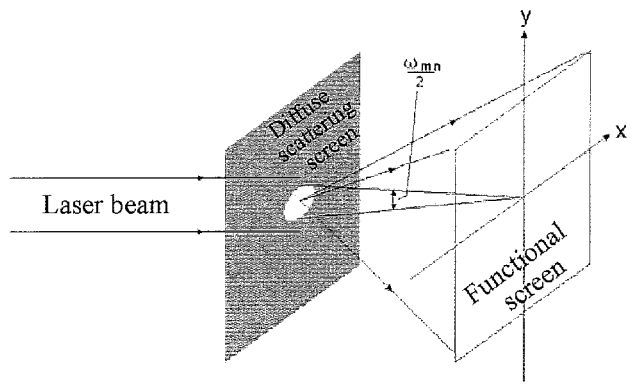
FIG. 28 is a schematic view of manufacturing a functional screen by a directional speckle method.

According to Chinese Patent No. ZL200410022193.7 entitled "METHOD AND DEVICE FOR MAKING DIGITAL SPECKLE HOLOGRAM", many digital or non-digital methods can be used to manufacture a directional scattering mold pressed hologram motherboard, which acts as the holographic functional screen. A basic principle is as follows. Parameters such as the particle size and distribution of speckles generated by using a laser beam to illuminate a diffuse scatterer are used to control to acquire a scattering spatial angle of corresponding parameters, which can be realized by adding clear apertures of reasonable shapes and sizes during the manufacturing. As shown in 28, a spatial angle formed by the clear aperture and the holographic functional screen is about $\omega_{mn}/2$. For HPO holographic projection display shown in FIG. 26, the clear aperture in FIG. 28 is strip-shaped, and a flare angle formed by the width of the clear aperture and the holographic functional screen is $\omega_{mn}/2$ ($\omega_n/2$ when M=1).

Figure 28A:
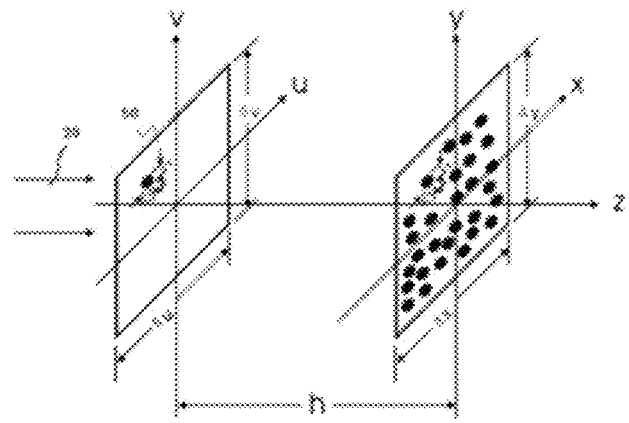
FIG. 28A is a schematic view of a basic principle of generating a digital speckle.
Figure 28B:
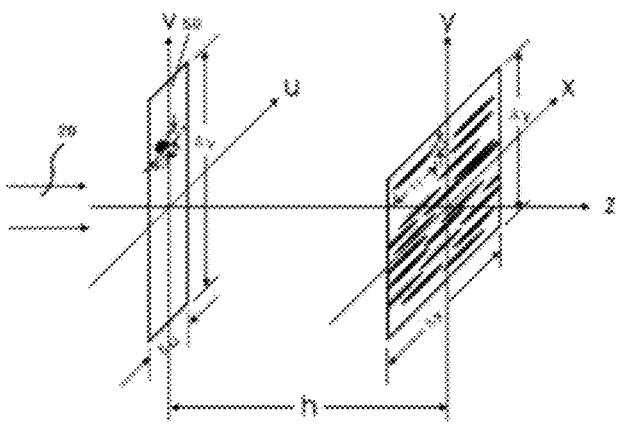
FIG. 28B is a schematic view of a basic principle of generating a directional digital speckle.
Figure 28C:
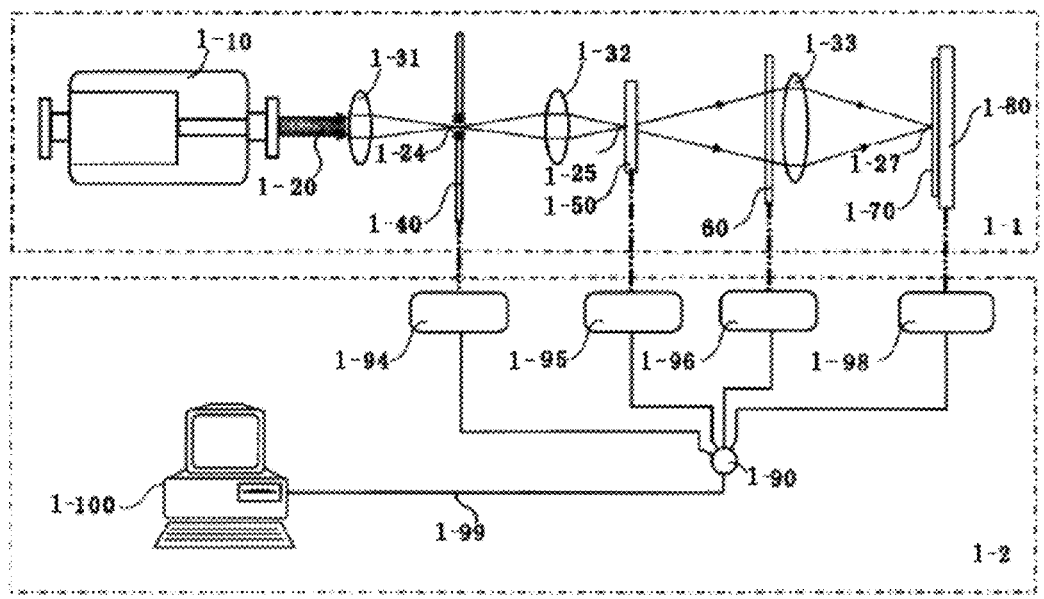
FIG. 28C is a schematic view of a method and a device for manufacturing a digital speckle hologram according to an embodiment of the present invention.

FIGS. 28A to 28C illustrate an embodiment of using a directional speckle method to manufacture a functional screen.

As shown in FIG. 28A, a basic principle of generating a digital speckle is as follows. A laser beam source 1-20 with a center wavelength being $\lambda$ and a bandwidth being $\Delta\lambda$ illuminates a diffuser with a size being $\delta u \times \delta v$, optical characteristic unevenness of the diffuser is ld, and a size of a diffuse element is $\Delta u \times \Delta v$. Observation is performed between planes x and y, a distance between which is h. An observed speckle pattern is as follows:

(1) if $\Delta\lambda \ll \text{ld}$, a contrast of the speckle is equal to 1,
(2) the size of the speckle satisfies:

$$\delta x = \lambda h / \delta u \quad (1a)$$

$$\delta y = \lambda h / \delta v \quad (1b)$$

(3) the size of coverage of the speckle satisfies:

$$\Delta = \lambda h / \Delta u \quad (2a)$$

$$\Delta y = \lambda h / \Delta v \quad (2b)$$

(4) a shape of an autocorrelation function of a speckle radiation intensity is like Fourier transform of a radiation intensity pattern on the diffuser.

According to FIG. 28A and Formulas (1a) and (1b), if the size of the diffuser satisfies $\delta u \ll \delta v$, on the speckle pattern, $\delta x \gg \delta y$, the speckle is a strip-shaped speckle, that is, a directional speckle.

As shown in FIG. 28B, if a speckle pattern as shown is illuminated, the light beam is scattered in a direction perpendicular to the speckle, that is, the scattered light is direction selective.

As shown in FIG. 28C, a method for manufacturing a digital speckle hologram according to the present invention comprises the following steps.

In Step (1), an optical imaging system 1 is disposed, which comprises a laser beam source 1-10, lenses 1-31, 1-32, and 1-33, a shutter 1-40, a diffuse scattering screen 1-50, an aperture component 1-60, a dry plate 1-70, and a dry plate platform 1-80. The lens 1-31 is disposed between the laser beam source 1-10 and the shutter 1-40. Outside the shutter 1-40, the lens 1-32, the diffuse scattering screen 1-50, the aperture component 1-60, the lens 1-33, the dry plate 1-70, and the dry plate platform 1-80 are disposed in sequence. The dry plate 1-70 is fixed on the dry plate platform 1-80.

In Step (2), the laser beam source 1-10 is turned on to emit a laser beam 1-20. The beam passes through the shutter 1-40 at a focal point 1-24 of the lens 1-31 and is then scattered, and is again focused into a spot 1-25 by the lens 1-32. The spot 1-25 is diffused on the diffuse scattering screen 1-50. After passing through the aperture component 1-60 and the lens 1-33, the diffused light is focused on the dry plate 1-70 to form a speckle 1-27 for imaging. The clear aperture that controls the generation of the spot has a strip shape, and a flare angle formed by the width of the strip to the dry plate is $\omega_n/2$.

In Step (3), the dry plate platform 1-80 is moved for multiple times, the aperture component 1-60 is rotated, and in combination with the opening and closing of the shutter 1-40, all points on the dry plate 1-70 are exposed for imaging.

The size of the spot 1-25 is acquired by adjusting a distance between the lenses 1-31 and 1-32.

A servo system 1-2 is further disposed in this embodiment.

Preferably, the moving of the dry plate platform 1-80 is driven by a dry plate platform driver 1-98 in the servo system 1-2 which is controlled by a microcomputer 1-100. The rotation of the aperture component 1-60 is driven by the aperture component driver 1-96 in the servo system 1-2 which is controlled by the microcomputer 1-100. The opening and closing of the shutter 1-40 is driven by a shutter driver 1-94 in the servo system 1-2 which is controlled by the microcomputer 1-100. Control software is fixed in the microcomputer 1-100, and the shape and arrangement law of the speckles are controlled by software. When the aperture component driver 1-96 rotates the aperture component 1-60, a long aperture 1-61 and a round aperture 1-63 are rotated respectively.

When the method is adopted, the required spatial spectrum stretching angle $\omega_{mn}$ depends on a flare angle formed by a center spacing of projection heads relative to human eyes during the restoration, and the stretching angle $\omega_{mn}$ required by the functional screen is acquired by controlling the aperture $\omega_{mn}/2$ for generating the spot.

A defect of the method is that the distribution of the scattering spatial angle of the manufactured screen can only be reflected qualitatively, but the spatial spectrum stretching of the scattering spatial angle cannot be manifested quantitatively in a strict manner. However, the method is sufficient for being applied in the implementation of the embodiment of the present invention.

b) Holographic Lens Method

Figure 29:
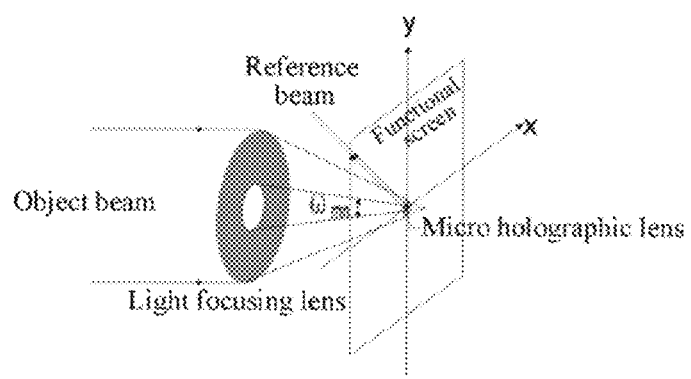
FIG. 29 is a schematic view of manufacturing a functional screen by a holographic lens method.

According to Chinese Patent No. ZL200510022425.3 entitled "HOLOGRAPHIC PROJECTION SCREEN, AND MANUFACTURING METHOD, SYSTEM, AND APPLICATION THEREOF", many digital or non-digital methods can be used to manufacture an off-axis directional diffractive mold pressed hologram motherboard, which acts as the holographic functional screen. A basic principle is: a spatial diffusion angle of each micro holographic lens is strictly controlled to be $\omega_{mn}$ in the process of manufacturing a holographic microlens array, as shown in FIG. 29. For HPO holographic projection display shown in FIG. 26, the clear aperture in FIG. 29 is strip-shaped, and a flare angle formed by the width of the aperture to the functional screen is $\omega_{mn}$ ($\omega_n$ when M=1).

FIGS. 29A to 29D illustrate an example of using the holographic lens method to manufacture the functional directional scattering screen.

Figure 29A:
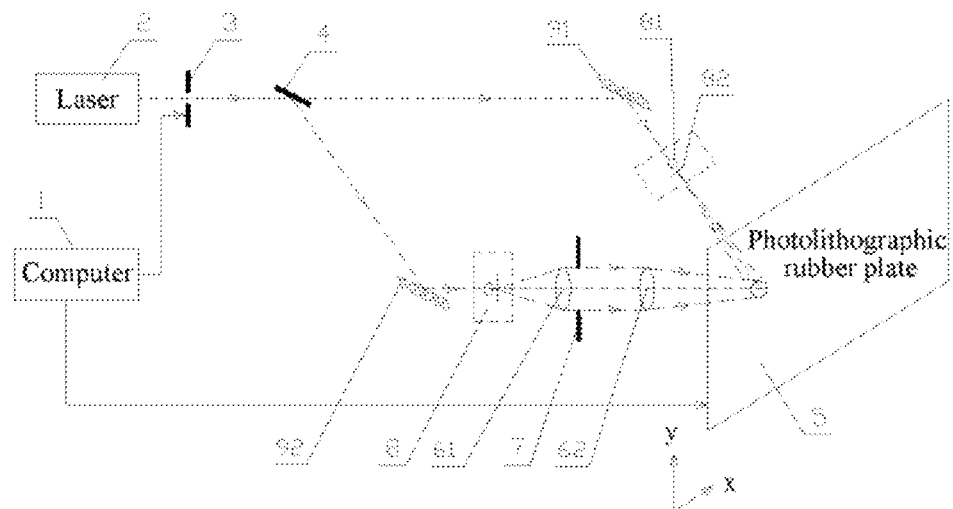
FIG. 29A is a schematic view of an optical structure of a system of manufacturing a holographic lens projection screen according to an embodiment of the present invention.

As shown in FIG. 29A, a system manufactured in this embodiment comprises a computer 2-1, a laser 2-2, a shutter 2-3, a beam splitter 2-4, a photoresist plate 2-5, lenses 2-61 and 2-62, an aperture 2-7, a spatial filter 2-8, and plane reflectors 2-91 and 2-92.

The laser 2-2 emits a laser beam, and the laser beam is divided into two paths by the beam splitter 2-4. One path is used to acquire an object beam of the lens 2-61, and the other path is used as a reference beam. The object beam and the reference beam converge on the photoresist plate 2-5 with an included angle. Both the light paths of the object beam and the reference beam are disposed with a spatial filter 2-8. The spatial filter 2-8 comprises a beam expanding lens 2-81 and a pinhole 2-82. The beam expanding lens 2-81 is placed in front of the pinhole 2-82. The two spatial filters 2-8 perform corresponding filtering on the object beam and the reference beam respectively.

The shutter 2-3 is placed in front of the laser beam, and controls exposure of the object beam and the reference beam on the photoresist plate 2-5. The computer 2-1 controls opening and closing, and an exposure volume of the shutter 2-3, and controls movement of the photoresist plate 2-5, so as to make the opening and closing of the shutter 2-3 be consistent with the movement of the photoresist plate 2-5.

The light path of the object beam is:
the laser 2-2→the shutter 2-3→the beam splitter 2-4→the plane reflector 2-92→the spatial filter 2-8→the lens 2-61→the aperture 2-7→the lens 2-62→the photoresist plate 2-5.

The light path of the reference beam is:
the laser 2-2→the shutter 2-3→the beam splitter 2-4→the plane reflector 2-91→the spatial filter 2-8→the photoresist plate 2-5.

Figure 29B:
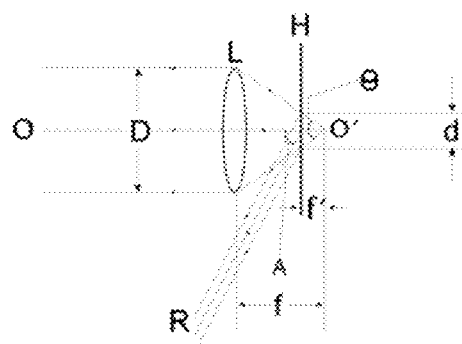
FIG. 29B is schematic view of principles of recording information of a holographic lens according to an embodiment of the present invention.

As shown in FIG. 29B, an object beam O is focused on a focal point O' by a lens L, an aperture of the lens L is D, and a focal length of the lens L is f. A holographic recording material H is placed near the focal point O', and is away from the focal point O' by a distance f'. The diameter of an object beam spot on H is d. A reference beam R enters with an incident angle A to record a hologram. The hologram recorded in this way resembles a holographic lens with an aperture being d, a focal length being f, and a reproduction angle being A, and a field angle θ of the holographic lens is the same as that of the lens L, that is, $2tg\theta = D/f = d/f$. According to the light paths shown in FIG. 43, the holographic material H is moved in an x direction and a y direction by a distance being the aperture d of the holographic lens, and is exposed in sequence, thereby acquiring a holographic lens array H, that is, a holographic screen, the minimum discernable distance of which is the size d of the holographic lens.

As shown in FIGS. 29A and 29C, a basic manufacturing process of the present invention comprises the following steps.

In Step I), the photoresist plate 2-5 records holographic lens information through exposure of the object beam and the reference beam thereon.

In Step II), the exposed photoresist plate is metalized, and a holographic lens array motherboard is generated by electroforming and splicing.

In Step III), mold pressing is performed on a thermoplastic material by using the motherboard to acquire a screen body attached with the holographic lens array information.

As shown in FIGS. 29A and 29D, a specific manufacturing process of the present invention comprises the following steps.

In Step 1, a laser beam emitted by the laser 2-2 is divided into two paths by the beam splitter 2-4. One path is used to acquire an object beam of the lens 2-61, and the other path is used as a reference beam. The object beam and the reference beam converge on the photoresist plate 2-5 with an included angle for exposure.

In Step 2, the opening and closing of the shutter 2-3 and the movement of the photoresist plate 2-5 are controlled by the computer 2-1 to make the opening and closing of the shutter 2-3 be consistent with the movement of the photoresist plate 2-5. The information of multiple holographic lenses is evenly recorded on the photoresist plate 2-5.

In the present invention, the computer 2-1 can control the exposure time and volume of the shutter 2-3, and meanwhile the computer 2-1 controls the displacement of the photoresist plate 2-5 in the x direction and the y direction. For example, the computer 2-1 controls rotate of a precision stepper motor, so as to drive the photoresist plate 2-5 to move.

In Step 3, when exposed at a position, the photoresist plate 2-5 is controlled by the computer 2-1 to move to a next position to be exposed again, and with such repetition, the information of multiple holographic lenses is evenly recorded on the photoresist plate 2-5, thereby forming a holographic projection screen. A clear aperture that controls the light beam to reach the photoresist plate is strip-shaped, and a flare angle formed by the width of the aperture and the photoresist plate is $\omega_n$.

In Step 4, the exposed photoresist plate is metalized, and a holographic lens array motherboard is generated by electroforming and splicing.

In Step 5, mold pressing is performed on a thermoplastic material by using the motherboard. The thermoplastic material is transparent, and may be Polyester (PET), Polyvinyl Chloride (PVC), Polycarbonate (PC) or Biaxial Oriented Polypropylene (BOPP). After the mold pressing, the material is in the shape of a hard plate or a film.

In Step 6, after the mold pressing, the holographic lens array of the thermoplastic material is coated with a protective layer. The protective layer may be a transparent or translucent medium protective layer made of $ZnS$ or $SiO_2$, and may also be a protective layer made of a metal reflective material (for example, coating by using aluminum or copper). Finally, a screen body with the thermoplastic material being a base material is acquired, and the screen body is attached with the holographic lens array information.

When the method is used to manufacture a functional display, the size of the aperture and the flare angle $\omega_{mn}$ formed by the aperture on the screen are adjusted to generate a spatial divergence angle of the holographic lens, so as to adjust a spatial spectrum stretching angle.

An advantage of the method is that the spatial diffusion angle distribution of the manufactured screen can be precisely controlled. A defect of the method is the inclined incident projection, so color distortion caused by the chromatic dispersion can hardly be eliminated, and the distortion phenomenon does not severely influence the HPO holographic projection display. Another obvious advantage of the method is a transparent imaging characteristic thereof, so that an image thereof is suspended in the air, thereby making the 3D display more attractive.

c) CGH Method

The manufacturing of a coaxial directional diffractive holographic functional screen is in fact equivalent to the manufacturing of a coaxial Fourier transform hologram mold pressed holographic motherboard with extremely high diffractive efficiency. The hologram on a spectrum surface is exactly manifested as even light intensity distribution on the unit areas $A_{mn}$ occupied by the projectors. The Fourier transform hologram can definitely be acquired according to the CGH theory and existing electron beam exposure or a diamond precision numerical control carving and outputting process.

d) Injection Molding Microlens Method

A mold of a microlens with a spatial divergence angle being $\omega_{mn}$ is designed by just modifying a radius of curvature, and an injection molding method is used to duplicate a corresponding plastic plate microlens array by using an array mold thereof, thereby effectively manufacturing the functional scattering screen. The size of the microlens determines the definition of the 3D display, and the divergence angle $\omega_{mn}$ depends on the arrangement parameters of the projectors.

e) Principles and Schemes of Moire Fringe Stretching Method

When none of the methods a), b), c), and d) can make a holographic functional screen whose limited stretching function is unable to ensure all projection image output spatial spectrums to be connected, the kind of screen may be overlapped, so as to make Moire fringes formed by two identical sets of output discrete spatial spectrum patterns to meet output requirements of a complete spatial spectrum.

A 3D real-time holographic display experimental system of the present invention is as follows.

By using the following experimental devices, a real-time holographic display scheme is verified, only holographic ideas are used herein, and a holographic recording material and an interference process which cannot be avoided before are avoided.

Figure 32:
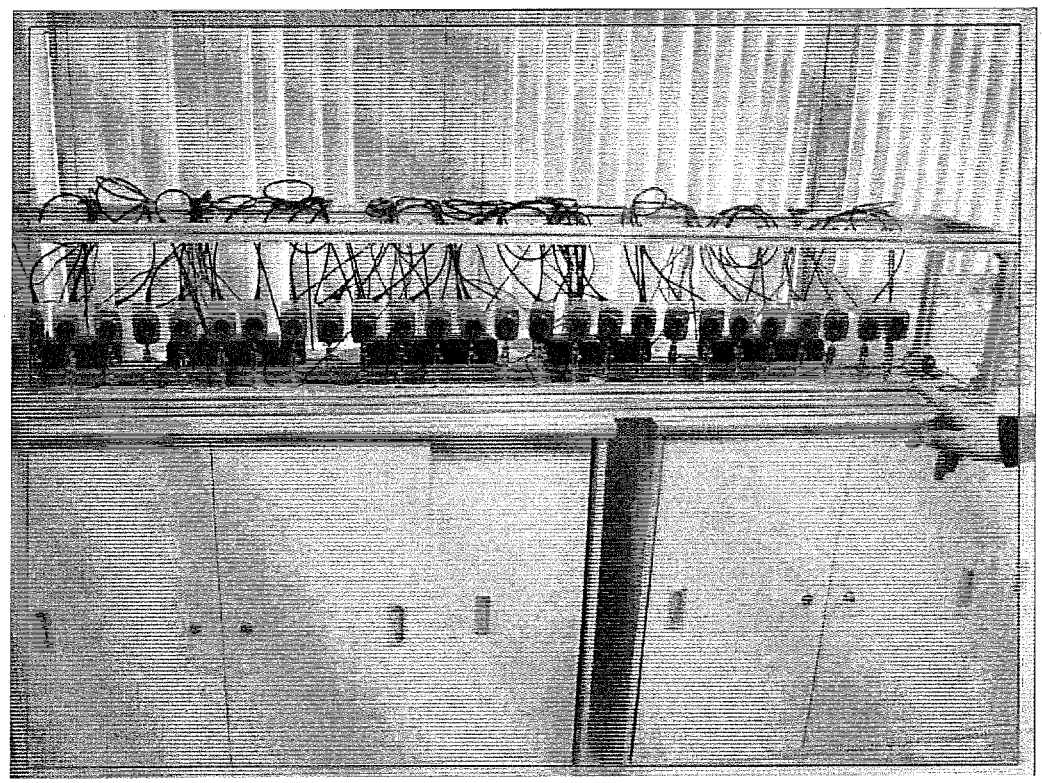
FIG. 32 is a schematic view of spatial spectrum sampling devices in an experimental system.
Figure 33:
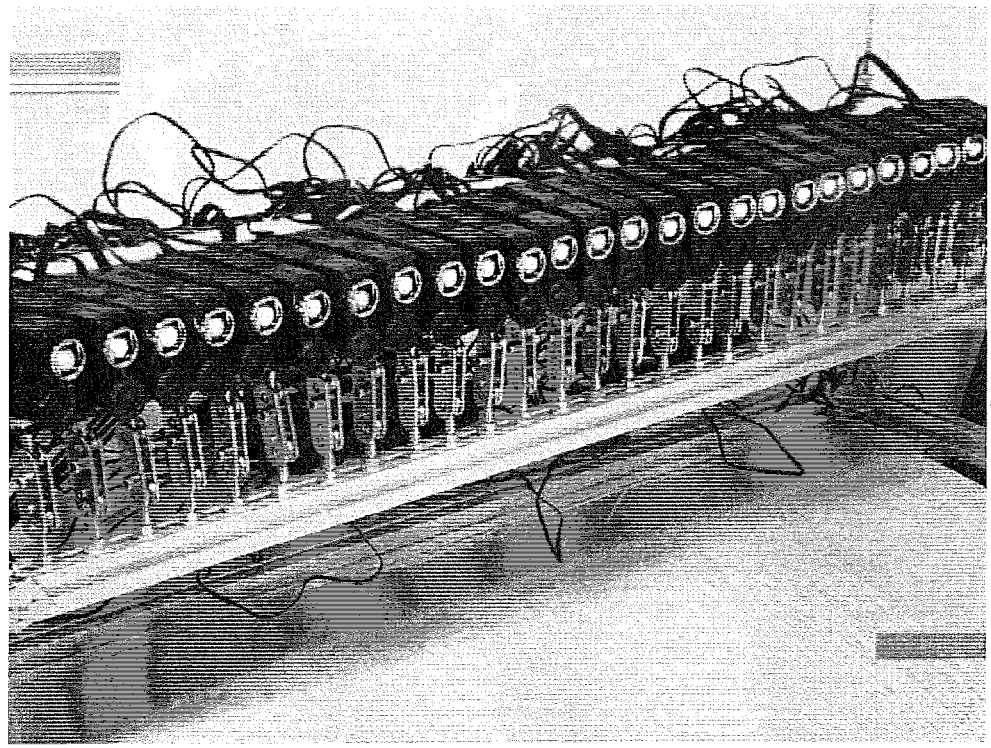
FIG. 33 is a schematic view of projection devices in an experimental system.

As shown in FIG. 31, in order to simplify an experimental process, 30 sets of photographing/projection devices are arranged in a linear array to realize HPO real-time 3D display. FIG. 32 shows a spatial spectrum capturing device, and the resolution of the cameras in FIG. 32 is 480×640 pixels. The devices are all anchored and focused at the same reference point R in the space shot by the cameras. For each camera, an acquired signal is directly connected to a projector corresponding to the camera through an ordinary Audio/video (AV) signal line. A formed projection array is as shown in the photo in FIG. 33. The resolution of the image projected by each projector is 480×640 pixels, and the images are strictly anchored and overlapped on a plane of a reference surface $P_R$ after being properly calibrated and corrected. A strip-shaped speckle holographic functional screen made by us is placed on the plane, and the size thereof is 48 cm×64 cm.

Figure 34:
FIG. 34 shows photos taken from a functional screen in different observation angles in an experimental system.

FIG. 34 shows two sets of photos on the functional screen captured in different observation angles, in which a real person is in the 3D space to be restored. In the experiment, the clear restored space with a scale of 1:1 is acquired, which obviously passes through the reference surface by a depth being about 50 cm. The ultimate optical information on the reference surface $P_R$ is very similar to a real image of an original object acquired by an imaging system through a huge aperture (about 2 m herein), but is a restrict restoration of optical information to be expressed by 30 horizontal sample spatial spectrums acquired by a huge $4f$ system specially formed by the unique photoelectric architecture. Eventually, the quality of the 3D display is much better than that of a single projected image having 480×640 pixels, and the 3D display is brighter since each hoxel contains information 30 times as much. The 3D display characteristic is achieved, no additional defect exists, and it is like you are watching a real-time show in the real space. At the first sight of the miracle, all people at the site are shocked.

Application of the Present Invention-Holographic Information Technology (HIT) Engineering People in the nature are like independent comprehensive intelligent detectors in the holographic nature, and are immersed in the sea of hoxels of the nature. Each hoxel can be regarded as a Fourier transform hologram of information of the nature with our mind being a reference point, which however expresses two different kinds of visual information, an image and a hologram, in the same physical manifestation form of the information of spatial distribution of light intensity. Therefore, we expect to develop a brand new kind of HIT engineering regarding free capturing and restoration of a spatial spectrum according to a principle described in FIG. 14. so as to realize the HIT era in the hopefully near future.

The followings are some extended feasible schemes.

1. Spatial Spectrum Sampling and Restoration of Curved Surface Tracks

Figure 35:
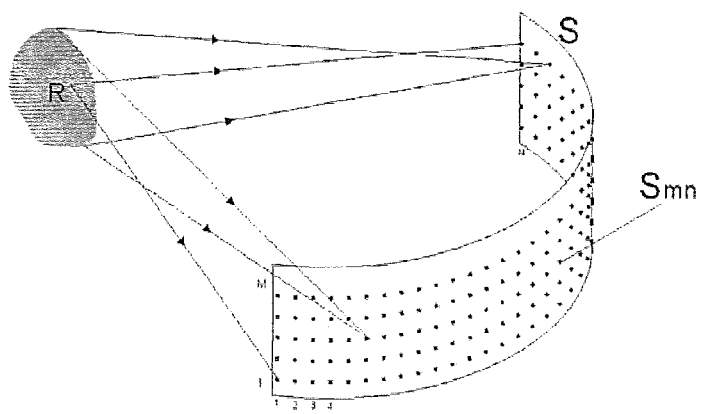
FIG. 35 is a schematic view of curved surface spatial spectrum sampling.
Figure 36:
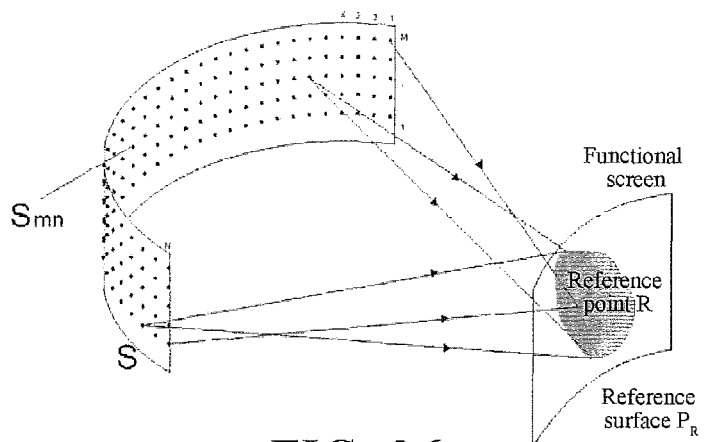
FIG. 36 is a schematic view of curved reference surface restoration.

FIGS. 35 and 36 are schematic views of capturing and restoring a spatial spectrum on a curved surface. An advantage of a curved surface is that, a sampling area and density can be used to achieve a relatively large spatial information range. The capturing and restoration manner of the spatial information is applicable to production of a full-spectrum movie and a TV program, 3D upgrade of all existing IT 2D display manners, and real-time 3D reconstruction and display of any image 3D information in the fields such as medical imaging, remote sensing and telemetry, and aerial photography, and definitely can be used to establish all kinds of special virtual spaces, so that network virtual realities are introduced in and mixed with the real life, thereby achieving interaction.

Figure 37:
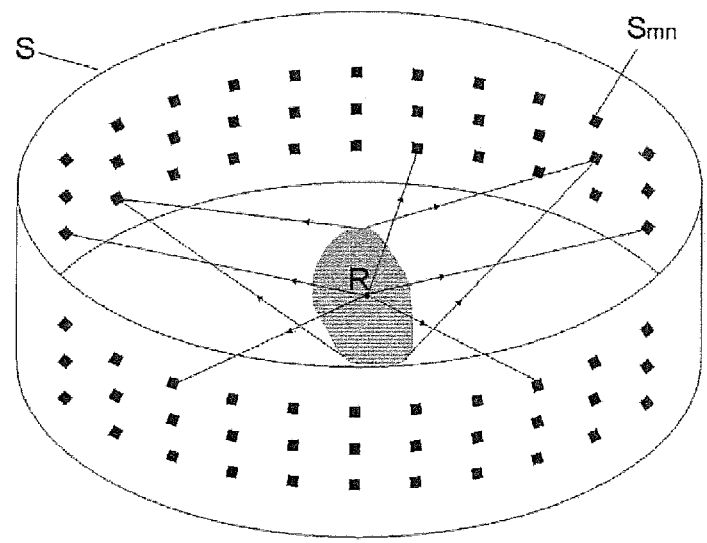
FIG. 37 is a schematic view of 360° inward cylindrical surface spatial spectrum sampling.
Figure 38:
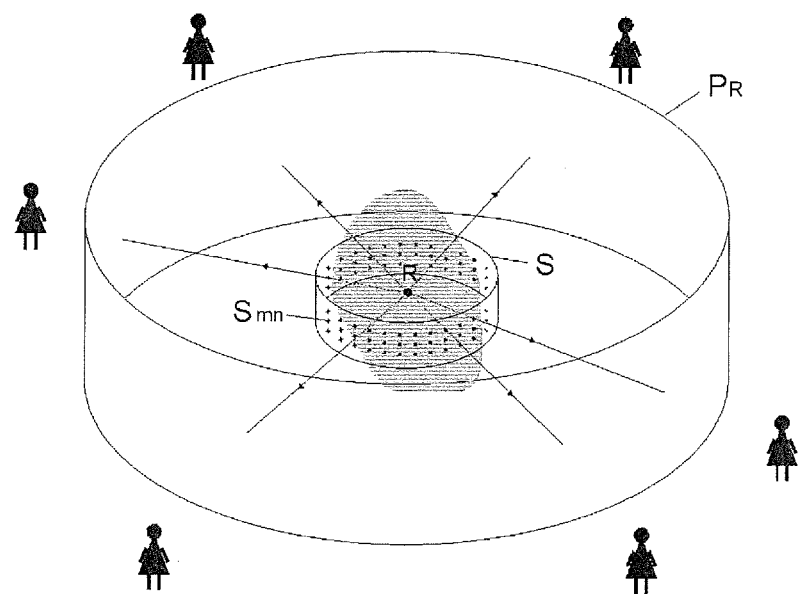
FIG. 38 is a schematic view of 360° cylindrical surface inwardly observed space information restoration.

2. Spatial Spectrum Sampling and Restoration of 360° Inner Cylindrical Surface Tracks The sampling and restoration manners of the 3D spatial information are shown in FIGS. 37 and 38. Like a 360° combined hologram, people are able to observe 3D spatial information restoration near an axis of a cylinder with the implication by a cylindrical reference surface. Therefore, a new holographic display tool emerges, which can enable people to learn a studied object in all directions and in a real-time manner, and may also combine with the modern microscopy technologies to make us have direct and profound understanding of 3D shapes of a micro object.

Figure 39:
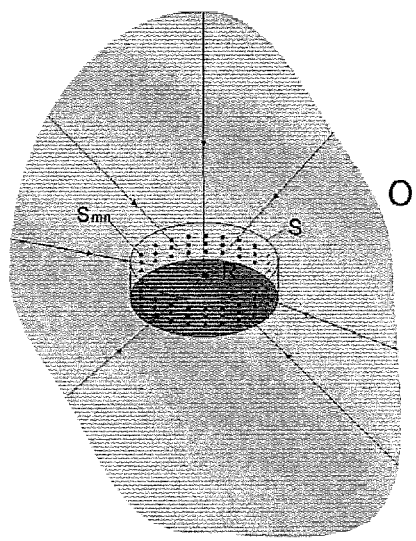
FIG. 39 is a schematic view of 360° outward cylindrical surface spatial spectrum sampling.
Figure 40:
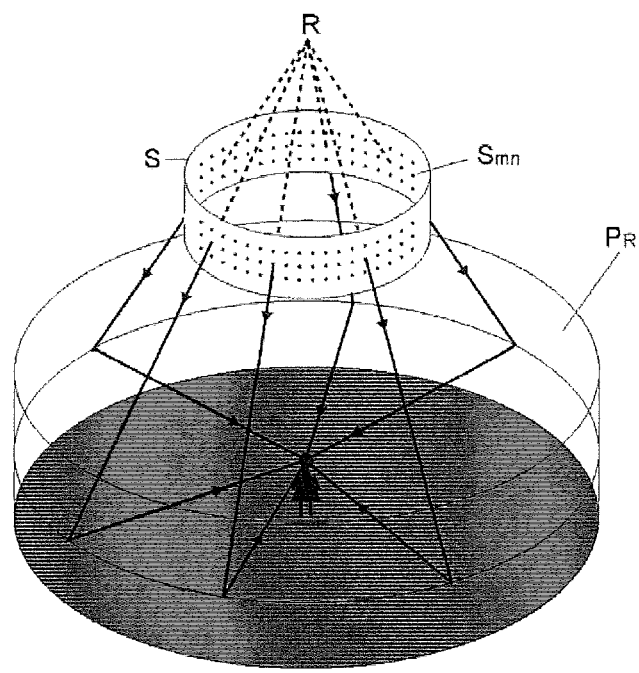
FIG. 40 is a schematic view of 360° outwardly observed space information restoration.

3. Spatial Spectrum Sampling and Restoration of 360° Outer Cylindrical Surface Tracks The sampling and restoration manners of 3D spatial information are shown in FIGS. 39 and 40. Like the current circular screen movie, as long as the spatial spectrum capturing density and the restoration stretching distribution are reasonable, people can as well observe the restored 3D spatial information in a cylinder by watching outwards with the implication by a cylindrical reference surface. Therefore, a new holographic display tool also emerges, which can make people feel like in any virtual space to feel the realities so that the history can be effectively restored and the future can be viewed with the help of the realistic hoxels, and a star map of the cosmic space with the earth being the origin is drawn when helped by a modern astronomical radio telescope.

4. Spatial Spectrum Sampling and Restoration of 360° Dome-Shaped Tracks

Figure 41:
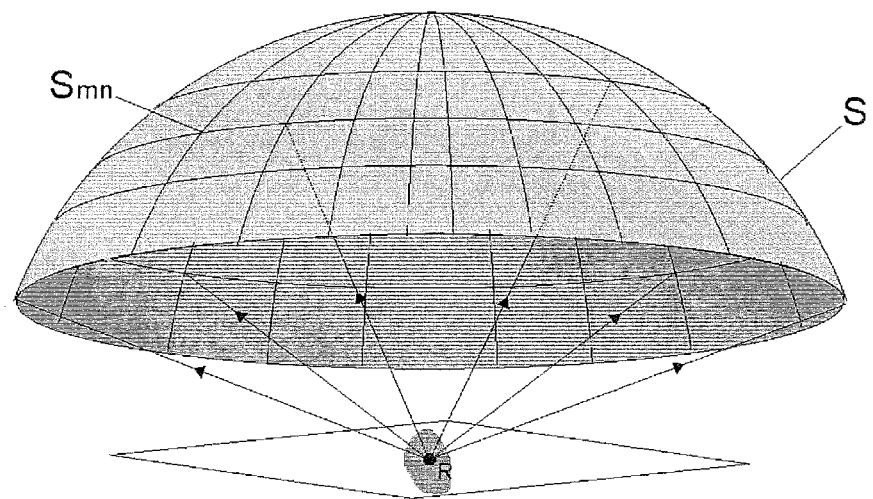
FIG. 41 is a schematic view of 360° dome-shaped spatial spectrum capturing.
Figure 42:
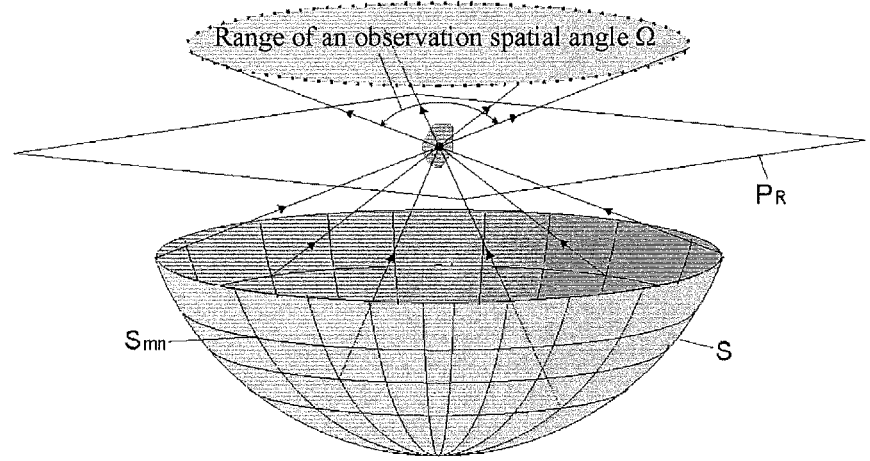
FIG. 42 is a schematic view of 360° platform space information restoration.

The sampling and restoration manners of 3D spatial information are shown in FIGS. 41 and 42. A difference between 4 and 2, 3 is that, the projective restoration reference surface herein is a plane, and 3D spatial information to be expressed by 360° dome-shaped track spatial spectrum sampling can be completely restored through effective spatial spectrum stretching of each hoxel on the reference surface, which is a main manifestation of a future 3D display medium, that is, a complete process of an entire football game is downsized proportionally to be placed on a desk to be viewed by people.

In short, the embodiment of the present invention performs processing by using the light perceived by humans as objective realities of discrete energy probability distribution of the nature. 4D Fourier transform is performed on a wave function or probability amplitude of discrete energy probability distribution of the photon, new description of light, the time spectrum and the spatial spectrum, is proposed. The concept of the spatial frequency in the existing imaging system is extended to be the inherent spatial spectrum of the nature, and meanwhile the concepts of recording and restoration of a complex wavefront (amplitude and phase) in the holography are extended to be the restoration of the inherent time spectrum and spatial spectrum of the nature. The physical essence of the embodiment of the present invention is digital holographic display based on theories of conventional holographic photography. A fundamental difference between the embodiment of the present invention and the existing digital holographic printing technologies is that, coherent optical means with high information redundancy used by the holography to restore 3D spatial information is effectively avoided. By performing corresponding and reasonable M×N discrete spatial spectrum sampling and stretching on the complete spatial spectrums of the studied object O, and by using the latest achievements in the modern digital information technologies, the spatial 3D information that can be manifested by the spatial spectrum sample is perfectly restored, thereby achieving the real-time holographic display and effectively freezing the time and space.

Principles and Methods Related to Anchoring in Embodiments of the Present Invention I. Principles of Anchoring 1. Principle of Selecting a Reference Point R(R')

Figure 43:
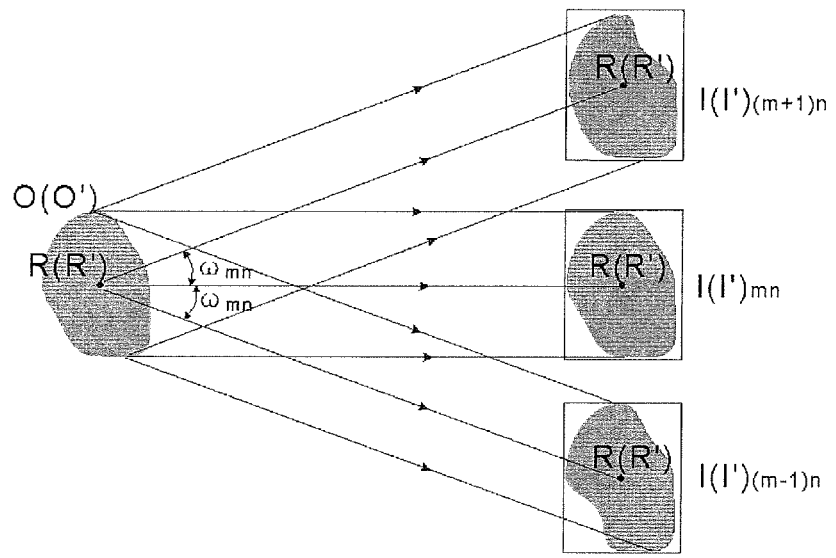
FIG. 43 is a schematic view of a spatial relationship between an object to be restored and a reference point.

1) As shown in FIG. 43, the reference point R(R') is used to determine the origin of the 3D space O(O') to be restored. Once the reference point is selected, a spatial corresponding relationship between the 3D spatial information O(O') to be restored and the reference point R(R') is completely determined. That is, a discrete spatial spectrum view $I(I')_{mn}$ of the 3D spatial information O(O') to be restored in each corresponding spatial sampling direction starting from the reference point R(R') is completely determined, in which (m,n) is a position coordinate corresponding to a capture point $S_{mn}$ on any spatial spectrum surface in FIG. 19, and $I_{mn}$ is equivalent to a spatial spectrum expression view corresponding to a hoxel $H_{mn}$ at $S_{mn}$ in the 3D space O to be restored and described in FIGS. 12 and 13. A spatial spectrum direction expressed by the view is a connecting line direction between the reference point R and the capture point $S_{mn}$, so that the reference point R is always located at the anchor center of each view. An included angle formed by two adjacent discrete spatial spectrum directions is the spatial sampling angle $\omega_{mn}$ shown in FIG. 27.

Figure 44:
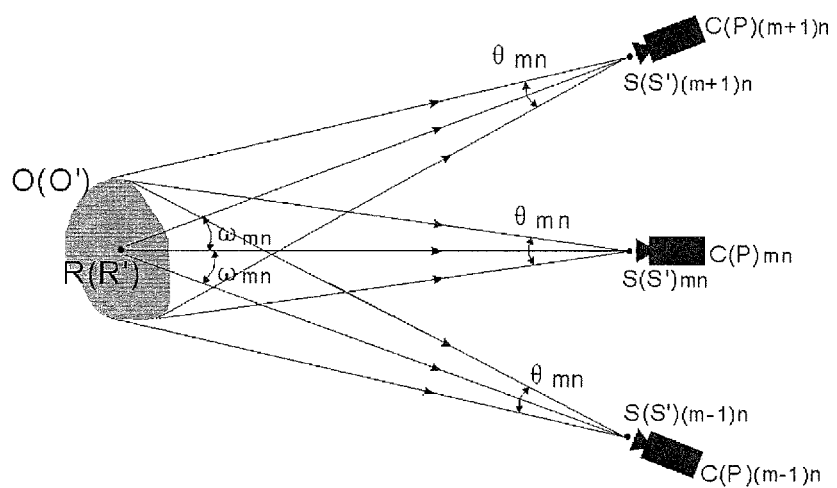
FIG. 44 is a schematic view of an inward anchoring situation.

2) As shown in FIG. 44, if an inherent field angle or a sampling angle (marked as $\theta_{mn}$) of each photographing/projection unit $C(P)_{mn}$ is sufficient, for capturing panoramic view expression of the 3D spatial information O(O') to be restored, the reference point R in the 3D spatial information O(O') to be restored is selected, that is, the case shown in FIG. 44 in which observation is performed inwards, and all the photographing/projection units are anchored inwards on the reference point R.

Figure 45:
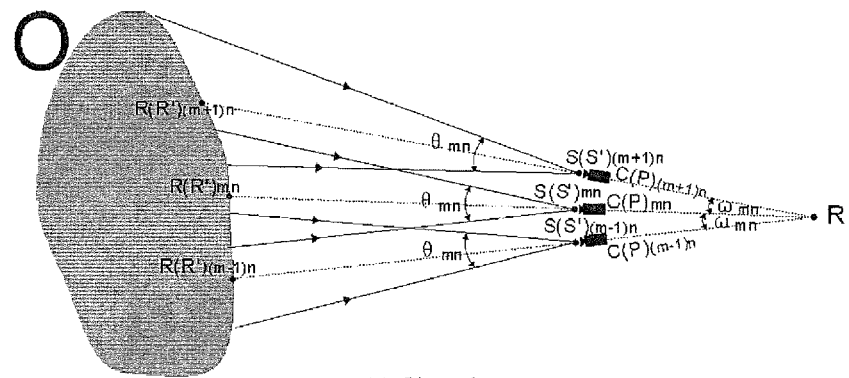
FIG. 45 is a schematic view of an outward anchoring situation.

3) As shown in FIG. 45, if the inherent field angle or the sampling angle $\theta_{mn}$ of each the photographing/projection unit is sufficient for capturing a part of the panoramic view expression of the 3D spatial information O(O') to be restored rather than the panoramic view expression, the reference point R(R') outside the 3D spatial information O(O') to be restored is selected, that is, the case shown in FIG. 45 in which observation is performed outwards, and all the photographing/projection units are anchored outwards on the reference point R.

Figure 46:
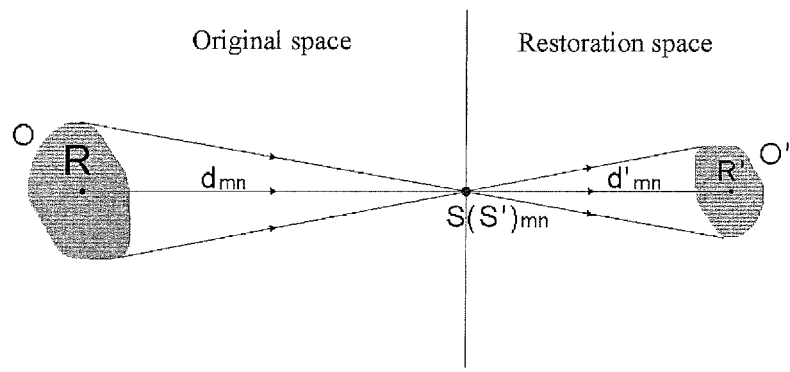
FIG. 46 is a schematic view of a proportional relationship of spatial restoration.

4) As shown in FIG. 46, a ratio relationship between the size of the restored 3D space O' and the size of the original 3D space O is referred to as a spatial amplification coefficient $M_s$, which is equal to a ratio between a spatial spectrum restoration distance $d'_{mn}$ and a spatial spectrum capture distance $d_{mn}$, that is $M_s = d'_{mn}/d_{mn}$. In FIG. 46, R is the reference point corresponding to the original 3D space O, and R' is the reference point corresponding to the restored 3D space O'.

2. Principle of Acquiring Spatial Spectrum Information $I_{mn}$

1) Once the reference point R is selected, corresponding expression view information of the spatial spectrum of the 3D spatial information O to be restored in each direction in the corresponding space starting from the reference point R is determined. The function of each photographing device shown in FIG. 44 is to clearly and effectively capture the view expression information $I_{mn}$ corresponding to the discrete spatial spectrum of the 3D space O in each sampling direction thereof.

2) In FIGS. 44 and 45, the capturing unit $C_{mn}$ at the capture point $S_{mn}$ has a corresponding depth of field and a field angle, and is anchored on the reference point R inwards or outwards to acquire clear image information $I_{mn}$ in each spatial spectrum direction.

3) When the anchoring is performed inwards, as shown in FIG. 19, in the 3D space O to be restored, the reference point R corresponds to the same center point of each view $I_{mn}$, and for each of the other points, a plane pixel $P_{mnjk}$ corresponding to the point can always be found in a projective position (j,k) of the spatial spectrum direction (m,n) corresponding to the point.

4) When the anchoring is performed outwards, as shown in FIG. 45, the view $I_{mn}$ is a part of the view of the 3D space O to be restored in the spatial spectrum direction (m,n) corresponding to the view $I_{mn}$ within the field angle $\theta_{mn}$. Center points of two adjacent views exactly correspond to the corresponding point information $R_{mn}$ on the original 3D space O and anchored to the spatial reference point R by the spatial sampling angle $\omega_{mn}$.

3. Principle of Selecting Restoration Space Reference Surface $P_R$

1) The spatial spectrum view information $I_{mn}$ captured according to Principle 2 can be projected to the restoration space reference surface $P_R$ according to the capture direction thereof (forwards or backwards) by using the corresponding projection unit $P_{mn}$ to restore the corresponding view information of the 3D space O in the corresponding spatial spectrum direction (m,n) thereof, as shown in FIG. 22.

2) The reference surface $P_R$ may be any curved surface, and the curved surface includes clear projective pattern light intensity distribution of the corresponding view information of the original 3D space O in the corresponding spatial spectrum direction (m,n) thereof. Therefore, the image projected by the projection unit $P_{mn}$ is required to be clearly imaged on the reference surface $P_R$, and necessary distortion correction is required to be performed on the image, so that the image completely matches the view projection of the original 3D space O in the spatial spectrum direction (m, n) on $P_R$.

Figure 47:
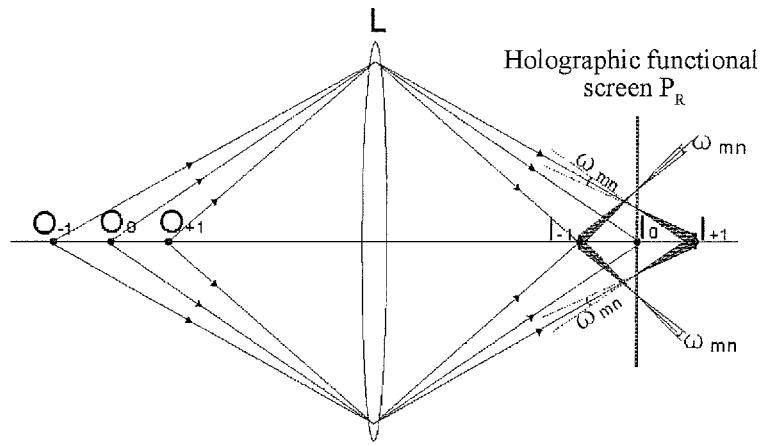
FIG. 47 is a schematic view of geometrical optical imaging.

3) The reference surface $P_R$ is in fact regarded as a hologram of spatial spectrum information required for completely restoring the 3D space O to be restored. The hologram uses the reference point R as the origin of the restoration space O' to truly reflect clear projective pattern light intensity distribution of the corresponding view information of the original space O in the corresponding spatial spectrum direction (m,n) thereof, and completely express the discrete spatial spectrum information through the holographic functional screen in the digital holographic display manner 4) Equivalent Geometrical Optical Imaging State When the above principles of anchoring are met, FIG. 47 shows the simulation of geometrical optical imaging performed by the special photoelectric hybrid processing system shown in FIG. 31. In FIG. 47, $O_0$ and $I_0$ correspond to a point on a corresponding surface of a strict object image. The holographic functional screen is placed on the reference surface $P_R$, and is the strict image plane. $O_{+1}$ and $I_{+1}$ correspond to a point in front of the object plane or the image plane, and satisfy a lens imaging relationship. For the reference surface $P_R$, $I_{+1}$ is a real image. $O_{-1}$ and $I_{-1}$ correspond to a point behind the object plane or the image plane, and satisfy a lens imaging relationship. For the reference surface $P_R$, $I_{-1}$ is a virtual image. Therefore, after passing through the holographic functional screen, all imaging light beams form cone light beam spatial distribution with a point on the holographic functional screen being the vertex and the spatial sampling angle $\omega_{mn}$ being the 3D cone angle. Innumerable basic units of original object space optical information sampling formed by the distribution constitute the holographic expression form of the space to be restored.

II. Method for Anchoring

If the 3D space O to be restored is virtual 3D space created by computer aided designing, the position of a reference point and parameters of cameras can be conveniently selected by using the 3D software, so as to acquire the corresponding spatial spectrum view meeting requirements of different kinds of 3D spatial display.

1. Method for Anchoring Spatial Spectrum Capture Photographing System

The spatial spectrum capturing of realistic 3D spatial information is different from pure geometric projection processing of a light beam simulated by a computer, involves a complicated imaging process and law of photographing/projection units, and may include the following steps.

Figure 48:
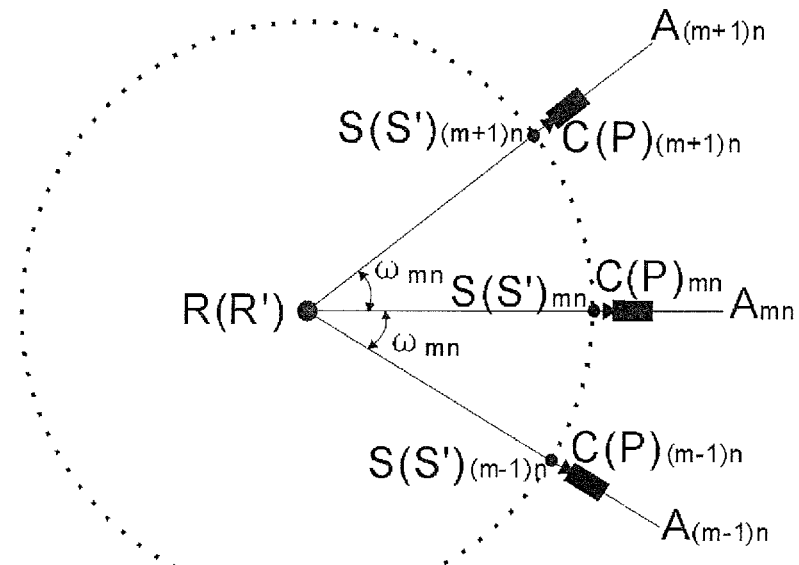
FIG. 48 is a schematic view of an anchoring method.

In Step 1), as shown in FIG. 48, a spatial reference point R in the original space is selected, and after M×N spatial spectrum sampling points $S_{mn}$ are selected according to a law that the spatial sampling angle is $\omega_{mn}$, entrance pupil centers of the capturing units $C_{mn}$ overlap $S_{mn}$, so as to make the imaging optical axis $A_{mn}$ of the capturing unit $C_{mn}$ be in the connecting line between the reference point R and the spatial spectrum sampling point $S_{mn}$. That is, the reference point R in the 2D image $I_{mn}$ captured by the capturing unit $C_{mn}$ corresponds to a visual center of the image.

In Step 2), an integrated system device formed by the M×N capturing units $C_{mn}$ fixed according to Step 1) can be used to perform inward anchor spatial spectrum capturing on corresponding 3D spatial information thereof. If the capturing unit $C_{mn}$ is rotated by 180° according to an imaging optical axis direction thereof, the device may also be used to perform outward anchor spatial spectrum capturing on the corresponding 3D spatial information thereof.

In Step 3), when the device is used to capture the spatial spectrum, the focal length of the capturing unit $C_{mn}$ is required to be adjusted according to practical situations, so as to make the spatial spectrum view clear and discernable.

2. Method for Anchoring Spatial Spectrum Restoration Projection System

Once the discrete spatial spectrum view information $I_{mn}$ of the 3D space O to be restored is determined, the 3D space can be holographically restored and displayed through a spatial spectrum restoration projection system formed by the M×N projection units $P_{mn}$. The method for anchoring the M×N projection units $P_{mn}$ comprises the following steps.

In Step 1), a restoration spatial reference point R' is selected, and after M×N spatial spectrum sampling restoration points $S'_{mn}$ are selected according to a law that the spatial sampling angle is $\omega_{mn}$, exit pupil centers of the projection units $P_{mn}$ overlap so as to make the imaging optical axis of each capturing unit $P_{mn}$ be in the connecting line between the reference point R' and the spatial spectrum sampling restoration point $S'_{mn}$. That is, the reference point R' in the 2D image $I_{mn}$ projected by the photographing unit $P_{mn}$ corresponds to a visual center of the image.

In Step 2), an integrated system device formed by the M×N projection units $P_{mn}$ fixed according to Step 1) can be used to perform inward anchor spatial spectrum restoration on corresponding 3D spatial information thereof. If the projection unit $P_{mn}$ is rotated by 180° according to an imaging optical axis direction thereof, the device may also be used to perform outward anchor spatial spectrum restoration on the corresponding 3D spatial information thereof.

3) When the device is used to perform spatial spectrum restoration, the focal length of each projection unit $P_{mn}$ is required to be adjusted according to practical situations, and corresponding distortion correction is required to be performed on the projected views, so that each spatial spectrum view has a clear and discernable geometric projection thereof corresponding to the original space on the reference surface $P_R$.

3. Method for Selecting Reference Surface $P_R$

The current development level of science and technology is far from being able to use the angular resolution $\omega_E$ of human beings as the spatial sampling angle $\omega_{mm}$ to capture or restore the spatial spectrum, so that during restoration, a suitable restoration reference surface $P_R$ is required to be selected, and a corresponding holographic functional screen is required to be placed on the reference surface, so as to display the restored discrete spatial spectrum information correctly and holographically.

1) Method for Selecting Plane Reference Surface and Distortion Correction

Figure 49:
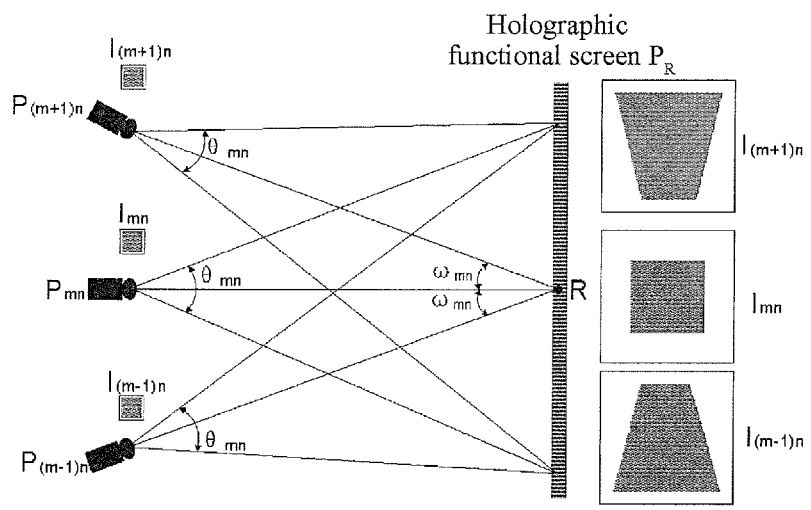
FIG. 49 is a schematic view of trapezoidal correction.

No matter the full view shown in FIG. 44 or a partial view shown in FIG. 45 are restored, the restoration reference surfaces may both be planes, and a front projection image plane of a spatial spectrum view $I_{mn}$ is selected, as shown in FIG. 49. In this case, except the front projection unit $P_{mn}$, the view projection of other projection units on $P_R$ has trapezoidal distortion to be corrected compared with the spatial spectrum view projection of the original 3D space in the direction, because the projection point is no longer infinite, which is especially critical for the cases shown in FIGS. 41 and 42.

2) Method for Selecting Curved Reference Surface and Purpose

Figure 50:
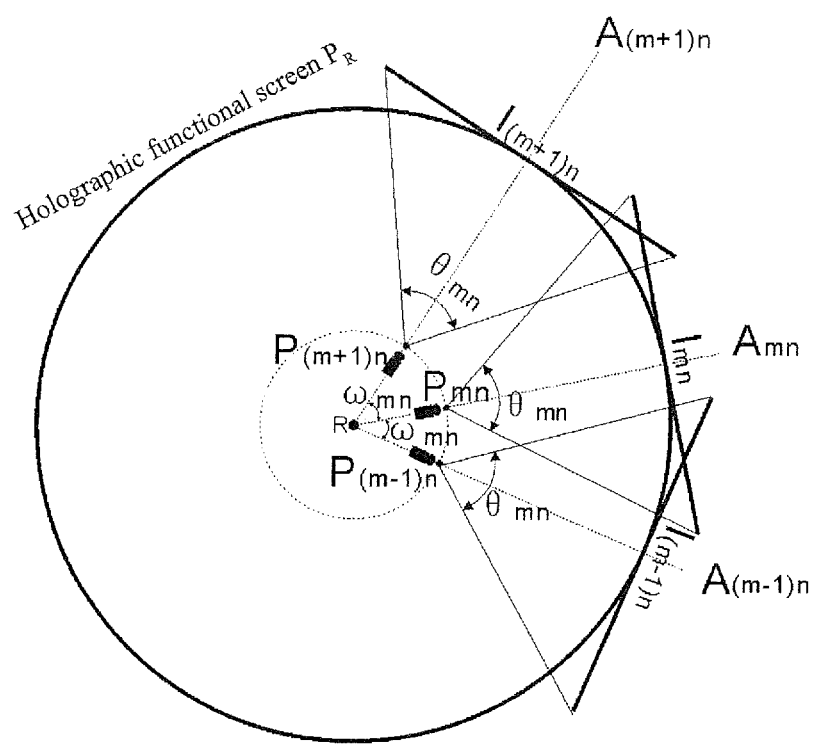
FIG. 50 is a schematic view of a method for selecting a curved reference surface.

For the selection of curved reference surfaces in the cases illustrated in FIGS. 35 to 40, the purpose is that the curved reference surface shall be an enveloping surface formed by restoration spatial spectrum view clear image planes. And the purpose is based on the following two facts.

a) As shown in FIG. 50, during front projection, with the sampling angle being $\omega_{mn}$, each restoration projection unit $P_{mn}$ is able to find a clear projection image $I_{mn}$ of the view thereof on a tangent plane of the enveloping surface with the divergence angle being $\theta_{mn}$. Definitely, if inclined incidence projection is inevitable, trapezoidal distortion correction has to be performed.

b) The original projection unit $P_{mn}$ must have a sufficient depth of field of clear projection, so that the clear spatial spectrum view projection on the enveloping surface is consistent with the original spatial spectrum expression.

In the present invention, with discernable information, a 2D image, carried by photons being the basic lead, and through the 4D Fourier transform of the wave function which is an objective description of discrete energy distribution of photons, the hoxel and the spatial spectrum, which are a pair of new physical concepts objectively existing in the nature are defined, and it is made clear that a 2D image is physically a geometric projection of a 3D space in one direction physically realized by the hoxels, that is, the physical manifestation form of the spatial spectrum. By capturing, restoring, and displaying the spatial spectrum, the objective of color real-time holographic 3D display is perfectly achieved. Corresponding keywords are discrete sampling, clear restoration, and complete display which are performed on the continuous spatial spectrums of the 3D spatial information to be restored. Corresponding effective measures to be taken are: synchronization anchoring, calibration and correction, and limited stretching.

The present invention uses rich software/hardware resources of modern digital image information technologies to realize recording and reproduction of wavefronts in the conventional holography in a real-time digitized manner. By referring to the basic principles and implementation means of the digital holographic printing technologies, sampling is performed by a 2D image array (M×N; at least one of M and N is greater than 2) on the spatial information to be displayed in a 3D manner, and the array sample image information array is projected to a special holographic functional screen. The function of the holographic functional screen is to restore complex spatial wavefronts to be expressed by the array image sample, so as to achieve perfect holographic 3D display intended to restore the complex wavefronts. The images of the projection units of the projection array can be transmitted and processed effectively in a real-time manner by using the achievements in the modern information technologies, so that perfect color real-time holographic 3D display can be realized, so as to bring forth a new generation human visual transmission super media, holographic movies and TV, programs, in the 21st century, which is able to remove the limitation of the 2D image on the thinking and communication of humans in the past hundreds of years.

The present invention enables humans to regard the image information as a spatial spectrum of the nature, and restore 3D realistic information by using hoxels to perform digital vector processing on the spatial spectrum.

According to the present invention, in the "spectrum domain category", rich software and hardware resources of the modern information technologies can be used to eliminate the inherent characteristic of high information redundancy of the conventional holography to re-discuss the holography. The essence is that the reasonable spatial spectrum sampling is performed, and 3D display of the nature is restored through corresponding hoxels on a holographic functional display.

In the present invention, the M×N image capturing/projection systems are used to arrange disorderly light beams formed of the spatial spectrums, and organize the light beams in order through the hoxels, so that a holographic functional display can be used to perform real-time holographic display, in which the holographic idea is able to be realized through the simple combination of the M×N channels and the existing IT achievements, which means that a brand new development stage of the holography is about to come, that is: the ultimate dream of 3D communications of human beings is realized during the integration of the existing IT industries. A new generation civilization manifestation form of the photon times is being expected, in which an image is only a spatial spectrum already well handled by the existing photoelectric technologies, and under the guide of the holographic idea, the whole world is to be immersed in the sea of 3D communications having the information amount M×N times as much as that at present.

What is claimed is:

1. A holographic three-dimensional (3D) display system, comprising a photographing and capturing device of color real-time holographic 3D image information, a projective restoration device of real-time holographic image information, and a holographic functional screen, wherein the photographing and capturing device comprises M×N color 2D image capturing units $C_{mn}$, which are used to sample and capture M×N spatial spectrums on any spatial spectrum surface S of an object O to be displayed in a 3D manner, each sample point $S_{mn}$ corresponds to a hoxel $H_{mn}$ of the object O, information captured by each image capturing unit $C_{mn}$ is equivalent to a spatial spectrum $I_{mn}$ corresponding to the hoxel $H_{mn}$, so that M×N arrays of sample spatial spectrum image information of the object O are acquired, the M×N color 2D image capturing units $C_{mn}$ are arranged on the spatial spectrum surface S according to preset spatial sampling angles $\omega_{mn}$, imaging optical axes thereof are anchored to a same reference point R of the space corresponding to the object O in the corresponding spatial spectrum direction to acquire the clear view $I_{mn}$ in the direction;

the projective restoration device comprises M×N color 2D image projection units $P_{mn}$, which are respectively used to simultaneously project the captured corresponding array sample view $I_{mn}$ at the M×N hoxels $H_{mn}$ to a reference surface $P_R$ in a restoration space corresponding to the original object O according to corresponding anchor relationships during the capturing, and make a projective pattern of each projective vie image on the reference surface be consistent with a spatial spectrum projective pattern view image on the reference surface to be consistent with a spatial spectrum view $I_{mn}$ of the original object O in the direction, M×N color 2D image projection units $P_{mn}$ are arranged on a corresponding surface S' of the spatial spectrum surface S in a restoration space according to the spatial sampling angles $\omega_{mn}$ same as those during capturing, and imaging optical axes of the projection units $P_{mn}$ are anchored on a corresponding point R' of the reference point R in the restoration space; M, N, m, and n are natural numbers, and at least one of M and N is greater than 2;

the holographic functional screen has regularly distributed fine spatial structures, which distribution makes an input light beam that has reached the holographic functional screen in any direction to have a corresponding spectrum spatial stretching output, wherein a spatial stretching angle of an output light beam is the spatial sampling angle $\omega_{mn}$ necessary for restoring a specific spatial 3D information, the holographic functional screen is placed on the reference surface $P_R$, and is used to perform a stretching corresponding to the spatial sampling angles $\omega_{mn}$ on input information of the view carried in each single spatial spectrum view $I_{mn}$, so that after the stretching, output spatial spectrum distributions of the views $I_{mn}$ are connected to each other, but do not overlap, thereby ensuring that a spatial spectrum of the restored 3D spatial information is restored and output continuously and completely, that is, for each hoxel $H_{jk}$ on the holographic functional screen, a stretching angle of spatial unidirectional input light beam is exactly the spatial sampling angle $\omega_{mn}$, thereby using a captured complete spatial spectrum of the object O to restore 3D display of the object.

2. The holographic 3D display system according to claim 1, wherein the capturing units of the photographing and capturing device respectively correspond to the projection units of the projective restoration device one by one, image information captured by each capturing unit is directly or indirectly transferred to the projection unit corresponding to the capturing unit in any digital image transmission format, without having to essentially code and reorganize the specific image information.

3. A holographic three-dimensional (3D) display method, comprising:

a photo capturing process of holographic 3D image information, a projective restoration process of real-time holographic image information, and a limited stretching process of a holographic functional screen; wherein the photo capturing process comprises the following steps: M×N color 2D image capturing units $C_{mn}$ are used to sample and capture M×N spatial spectrums on any spatial spectrum surface S of an object O to be displayed in a 3D manner, each sample point $S_{mn}$ corresponds to a hoxel $H_{mn}$ of the object O, information captured by each image capturing unit $C_{mn}$ is equivalent to a spatial spectrum view $I_{mn}$ corresponding to the hoxel $H_{mn}$, so that M×N arrays of sample spatial spectrum image information of the object O are acquired, the M×N color 2D image capturing units $C_{mn}$ are arranged on the spatial spectrum surface S according to preset spatial sampling angles $\omega_{mn}$, imaging optical axes thereof are anchored to a same reference point R of the space corresponding to the object O, and each image capturing unit focuses on a visible surface of the object O in the corresponding spatial spectrum direction to acquire the clear view in the direction;

the projective restoration process comprises the following steps: M×N color 2D image projection units $P_{mn}$ are respectively used to simultaneously project the captured corresponding array sample view at the M×N hoxels $H_{mn}$ to a reference surface $P_R$ in a restoration space corresponding to the original object O according to corresponding anchor relationships during the capturing, and make a projective pattern of each projective view image on the reference surface be consistent with a spatial spectrum view $I_{mn}$ of the original object O in the direction, the M×N color 2D image projection units $P_{mn}$ are arranged on a corresponding surface S' of the spatial spectrum surface S in a restoration space according to the spatial sampling angles $\omega_{mn}$ same as those during the capturing, and imaging optical axes of the projection units $P_{mn}$ are anchored on a corresponding point R' of the reference point R in the restoration space;

M, N, m, and n are natural numbers, and at least one of M and N is greater than 2;

the holographic functional screen has regularly distributed fine spatial structures, which distribution makes an input light beam that has reached the holographic functional screen in any direction to have a corresponding spectrum spatial stretching output, wherein a spatial stretching angle of an output light beam is the spatial sampling angle $\omega_{mn}$ necessary for restoring a specific spatial 3D information;

the limited stretching process of the holographic functional screen comprises the following steps: the holographic functional screen is placed on the reference surface $P_R$, so as to perform a stretching corresponding to the spatial sampling angles $\omega_{mn}$ on input information of the view carried in each single spatial spectrum view $I_{mn}$, so that after the stretching, output spatial spectrum distributions of the views $I_{mn}$ are connected to each other, but do not overlap, thereby ensuring that a spatial spectrum of the restored 3D spatial information is restored and output continuously and completely, that is, for each hoxel $H_{jk}$ on the holographic functional screen, a stretching angle of a spatial unidirectional input light beam is exactly the spatial sampling angle $\omega_{mn}$, thereby using a captured complete spatial spectrum of the object O to restore 3D display of the object.

4. The holographic 3D display method according to claim 3, wherein the capturing units in the capturing process respectively correspond to the projection units in the projective restoration process one by one, image information captured by each capturing unit is directly or indirectly transferred to the projection unit corresponding to the capturing unit in any digital image transmission format, without having to essentially code and recognize the specific image information.

5. The holographic 3D display method according to claim 3, wherein besides spatial position calibration, corresponding time synchronization and color/brightness calibration further require to be performed on the capturing/projection units, so as to guarantee real-time restoration fidelity of the input/output information.

6. The holographic 3D display method according to claim 4, wherein besides spatial position calibration, corresponding time synchronization and color/brightness calibration further require to be performed on the capturing/projection units, so as to guarantee real-time restoration fidelity of the input/output information.

7. The holographic 3D display method according to claim 3, wherein all the projection arrays are arranged on a curved surface or curve in the space according to practical situations, so as to realize the holographic 3D display, and the restored 3D space may be enlarged or downsized compared with the original 3D space.

8. The holographic 3D display method according to claim 4, wherein all the projection arrays are arranged on a curved surface or curve in the space according to practical arrays are arranged on the curved surface or curve in the space according to practical situations, so as to realize the holographic 3D display and the restored 3D space may be enlarged or downsized compared with the original 3D space.

9. The holographic 3D display method according to claim 3, wherein the reference surface $P_R$ is a curved surface, so as to meet diversified demands of holographic 3D display, and the projection units present clear and discernible specific image information on the reference surface $P_R$, ad already complete necessary corresponding graphic distortion connection thereof.

10. The holographic 3D display method according to claim 4, wherein the reference surface $P_R$ is a curved surface, so as to meet diversified demands of holographic 3D display, and the projection units present clear and discernible specific image information on the reference surface $P_R$, ad already complete necessary corresponding graphic distortion connection thereof.

11. The holographic 3D display method according to claim 3, wherein the spatial spectrum spatial sampling angle $\omega_{mn}$ or the reciprocal thereof, $1/\omega_{mn}$, the spatial sampling density of the system determines capability of restoring clear and discernible 3D spatial information of the system, that is, the holographic functional screen outputs a real image or virtual image spot at a location away from the reference surface $P_R$ by a distance $\Delta Z$, and the size of the spot is similar to that of a plane pixel of each spatial spectrum input image on gthe screen.

12. The holographic 3D display method according to claim 4, wherein the spatial spectrum spatial sampling angle $\omega_{mn}$ or the reciprocal thereof, $1/\omega_{mn}$, the spatial sampling density of the system determines capability of restoring clear and discernible 3D spatial information of the system, that is, the holographic functional screen outputs a real image or virtual image spot at a location away from the reference surface $P_R$ by a distance $\Delta Z$, and the size of the spot is similar to that of a plane pixel of each spatial spectrum input image on gthe screen.

13. The holographic 3D display method according to claim 3, wherein imaging quality of the capturing/projection units involves a field angle, resolution, brightness, contrast, color gradation, and color saturation, to which existing basic standards of ordinary 2D image display is applied.

14. The holographic 3D display method according to claim 4, wherein imaging quality of the capturing/projection units involves a field angle, resolution, brightness, contrast, color gradation, and color saturation, to which existing basic standards of ordinary 2D image display is applied.

15. The holographic 3D display method according to claim 3, wherein principles of anchoring the capturing/projection units are as follows: 1) A view image processed by the capturing/projection unit represents a geometric projection of the 3D object O in a spatial spectrum direction determined by a connecting line between an anchor point R(R') and a sampling point $S_{mn}(S'_{mn})$, that is, an image plane is a normal plane in each capturing/projection direction, 2) the view image does not rotate in an imaging optical axis direction of the capturing/projection unit in the image plane.

16. The holographic 3D display method according to claim 4, wherein principles of anchoring the capturing/projection units are as follows: 1) A view image processed by the capturing/projection unit represents a geometric projection of the 3D object O in a spatial spectrum direction determined by a connecting line between an anchor point R(R') and a sampling point $S_{mn}(S'_{mn})$, that is, an image plane is a normal plane in each capturing/projection direction, 2) the view image does not rotate in an imaging optical axis direction of the capturing/projection unit in the image plane.

17. The holographic 3D display method according to claim 3, wherein corresponding graphic distortion and focus adjustment are performed on spatial spectrum view information processed by the capturing/projection units.

18. The holographic 3D display method according to claim 4, wherein corresponding graphic distortion and focus adjustment are performed on spatial spectrum view information processed by the capturing/projection units.

* * * * *